(12) United States Patent
Sharma et al.

(10) Patent No.: US 10,095,739 B2
(45) Date of Patent: Oct. 9, 2018

(54) SYSTEMS AND METHODS FOR CACHING OF SQL RESPONSES USING INTEGRATED CACHING

(71) Applicant: Citrix Systems, Inc., Fort Lauderdale, FL (US)

(72) Inventors: Shaleen Sharma, Bangalore (IN); Sudish Sah, Bangalore (IN); Rajesh Joshi, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/978,830

(22) Filed: Dec. 22, 2015

(65) Prior Publication Data

US 2016/0110416 A1 Apr. 21, 2016

Related U.S. Application Data

(63) Continuation of application No. 13/858,007, filed on Apr. 6, 2013, now Pat. No. 9,235,618.

(51) Int. Cl.
*G06F 17/30* (2006.01)
(52) U.S. Cl.
CPC .. *G06F 17/30457* (2013.01); *G06F 17/30132* (2013.01)
(58) Field of Classification Search
None
See application file for complete search history.

(56) References Cited

U.S. PATENT DOCUMENTS

| 5,903,887 | A | * | 5/1999 | Kleewein | G06F 17/30457 |
| 6,115,703 | A | | 9/2000 | Bireley et al. | |
| 6,598,058 | B2 | | 7/2003 | Bird et al. | |
| 7,209,929 | B2 | | 4/2007 | Dominguez et al. | |
| 7,251,657 | B2 | * | 7/2007 | Saha | G06F 17/30457 |
| 7,395,258 | B2 | * | 7/2008 | Altinel | G06F 17/3048 |
| 2003/0236780 | A1 | | 12/2003 | Saha et al. | |
| 2004/0210909 | A1 | | 10/2004 | Dominguez et al. | |
| 2006/0026154 | A1 | * | 2/2006 | Altinel | G06F 17/3048 |
| 2006/0271557 | A1 | * | 11/2006 | Harward | G06F 9/52 |

(Continued)

OTHER PUBLICATIONS

U.S. Notice of Allowance in U.S. Appl. No. 13/858,007 dated Sep. 8, 2015.

(Continued)

*Primary Examiner* — Hung Le
(74) *Attorney, Agent, or Firm* — Foley & Lardner LLP; Christopher J. McKenna

(57) ABSTRACT

Systems and methods of the present disclosure provide for caching, by a device intermediary to a client and a database, a result of a structured query language (SQL) query request. In some embodiments, the device intermediary to a plurality of clients and a database receives a SQL response from the database to a first SQL query request of a client of the plurality of clients. The device may maintain a cache of SQL responses from the database. The device may identify that the first SQL query request matches a rule of a policy for caching SQL responses from the database. The policy may include a cache action to take when the rule is matched. The device may perform, responsive to the policy, on the SQL response the cache action identified by the policy.

20 Claims, 22 Drawing Sheets

(56) References Cited

U.S. PATENT DOCUMENTS

| | | | |
|---|---|---|---|
| 2008/0183684 A1* | 7/2008 | Bestgen | G06F 17/30463 |
| 2008/0222111 A1* | 9/2008 | Hoang | G06F 17/30289 |
| 2011/0071981 A1 | 3/2011 | Ghosh et al. | |
| 2011/0072217 A1* | 3/2011 | Hoang | G06F 12/084 |
| | | | 711/130 |
| 2011/0231481 A1* | 9/2011 | Calahan | G06F 17/3056 |
| | | | 709/203 |
| 2011/0320409 A1* | 12/2011 | Iyengar | G06F 17/30377 |
| | | | 707/674 |
| 2012/0084315 A1* | 4/2012 | Schneider | G06F 17/30442 |
| | | | 707/769 |
| 2012/0108225 A1* | 5/2012 | Luna | H04L 12/66 |
| | | | 455/418 |
| 2012/0158650 A1* | 6/2012 | Andre | G06F 17/30457 |
| | | | 707/611 |
| 2012/0158770 A1* | 6/2012 | Benadjaoud | G06F 17/30457 |
| | | | 707/769 |
| 2012/0166483 A1* | 6/2012 | Choudhary | G06F 17/30545 |
| | | | 707/770 |
| 2013/0110961 A1 | 5/2013 | Jadhav | |
| 2013/0159347 A1* | 6/2013 | Klein | G06F 17/3048 |
| | | | 707/771 |
| 2013/0198231 A1* | 8/2013 | Skidanov | G06F 17/30545 |
| | | | 707/770 |
| 2014/0280483 A1* | 9/2014 | Schmidt | H04L 67/06 |
| | | | 709/203 |
| 2014/0310232 A1* | 10/2014 | Plattner | G06F 17/3048 |
| | | | 707/602 |

OTHER PUBLICATIONS

U.S. Office Action in U.S. Appl. No. 13/858,007 dated Jan. 23, 2015.

U.S. Office Action in U.S. Appl. No. 13/858,007 dated May 13, 2015.

* cited by examiner

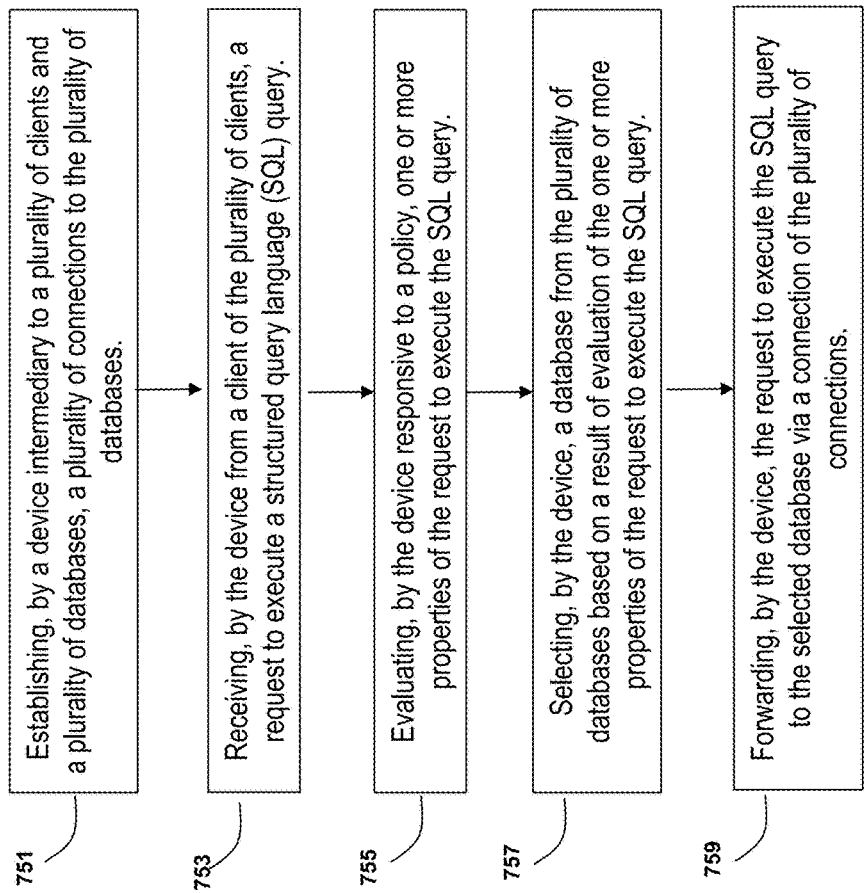

SYSTEMS AND METHODS FOR CACHING OF SQL RESPONSES USING INTEGRATED CACHING

RELATED APPLICATION

The present application is a continuation of and claims priority to and the benefit of U.S. Non-provisional application Ser. No. 13/858,007, titled "Systems and Methods For Caching of SQL Responses Using Integrated Caching" and filed on Apr. 6, 2013, which is incorporated herein by reference in its entirety for all purposes.

FIELD

The present application generally relates to data communication networks. In particular, the present application relates to systems and methods of caching structured query language (SQL) using integrated caching.

BACKGROUND

In data communication networks, client devices can request information from a database server via a network. As the number of information requests and the data size of the information increases, it may be challenging for database servers to efficiently provide responses to the requests.

BRIEF SUMMARY

Systems and methods of the present disclosure are directed to caching, by a device intermediary to a client and a database, a result of a structured query language ("SQL") query request. For example, the intermediary device can include an appliance (e.g., multi-core appliance and/or node of a cluster) that intercepts a query sent from a client. The intermediary device may then examine the query to determine whether a response to the query can be served from a cache being maintained by the intermediary device. In the event a response to the query can be served from cache, the intermediary device can serve the response to the query from the cache.

The first time the intermediary device executes a query, the intermediary device may apply a policy to determine whether the response to the query should be stored. If the policy evaluates to true or otherwise indicates that the response to the SQL query should be stored in the cache, the intermediary device can store the response from the server in cache memory associated with the intermediary device. Subsequent to storing the response in cache memory, if the intermediary device intercepts an SQL query requesting the same data, the intermediary device can serve a response to the SQL query from the cache memory without having to contact the server.

Various cache policies can be used to control the cache behavior, including what the intermediary device stores in cache, cache expiration and cache invalidation. Cache policies can include request and/or response-based policies can include the cache actions such as CACHE, INVAL, and NOCACHE.

In some embodiments, hashing techniques can facilitate storing responses to the SQL query in cache memory. For example, a Policy Infrastructure ("PI") expression can be used to derive a cache selector, and the cache selector can be used to determine a key for a hash function. For example, the hash function can use two or more fields (e.g., username, database name, character set, and client version) to calculate a hash value indicating where to store the response in cache memory. Cache selectors can further be associated with content groups, which may refer to entities that store the cached objects. Content groups may facilitate taking some action on a related set of data. For example if a cache group is configured to contain all data pertaining to a particular database, then a subsequent insert operation on this database can trigger the expiry of caches in this group.

The intermediary device may also be configured to provide offline caching. For example, in the event the database server is not available or the intermediary device cannot otherwise reach the database server, the intermediary device can continue to serve data from the cache. If the requested data is not available in cache, the intermediary device can be configured to generate an error message in response to the request from the client.

In some aspects, the present solution is directed towards a method for caching, by a device intermediary to a client and a database, a result of a structured query language ("SQL") query request. In some embodiments, the method includes receiving, by a device intermediary to a plurality of clients and a database, a SQL response. The SQL response can be received from the database and can be in response to a first SQL query request of a client of the plurality of clients. The device can maintain a cache of SQL responses from the database. The method can include identifying, by the device, that the first SQL query request matches a rule. The rule can be a rule of a policy for caching SQL responses from the database, and the policy can include a cache action to take when the rule is matched. The method can include the device performing on the SQL response. The device can, responsive to the policy, perform the cache action identified by the policy on the SQL response.

In some embodiments, the method includes identifying that the SQL response from the first SQL query request is stored in the cache. The device can identify that the SQL response is stored in the cache responsive to receiving, from one of the plurality of clients, a second SQL query request that includes the SQL query of the first SQL query request.

In some embodiments, the method includes serving the SQL response. The device can serve the SQL response responsive to the second SQL query request.

In some embodiments, the method includes maintaining the SQL responses in the cache via a hash. The device can maintain the response in the cache via a hash of two or more of the following: username, database name, character set and client version.

In some embodiments, the method includes identifying, by the device, that an expression of the rule matches SQL content of the first SQL query request.

In some embodiments, the method includes identifying, by the device, that the cache action of the policy specifies an action. The action can be one of to store to cache, not cache or invalidate a corresponding cache entry.

In some embodiments, the method includes storing, by the device, the SQL response to the cache. The SQL response can be stored responsive to the cache action of the policy specifying an action to cache.

In some embodiments, the method includes invalidating, by the device, the SQL response stored in the cache. The SQL response can be invalidated responsive to the cache action of the policy specifying an action to invalidate.

In some embodiments, the method includes identifying, by the device, that the policy specifies a selector for identifying a group of content to which the policy applies.

In some embodiments, the method includes performing, by the device, the cache action of the policy. The cache action can be performed on the group of content identified by the selector.

In some aspects, the present solution is directed towards a system for caching, by a device intermediary to a client and a database, a result of a SQL query request. In some embodiments, the system includes a device intermediary to a plurality of clients and a database. The device can include a cache configured to cache SQL responses from the database. The device can include a database proxy that receives an SQL response from the database. The response can be to a first SQL query request of a client of the plurality of clients. The system can include a policy engine configured to identify that the first SQL query request matches a rule of a policy for caching SQL responses from the database. The policy can include a cache action to take when the rule is matched. The device can be configured to perform, responsive to the policy, the identified cache action on the SQL response.

In some embodiments of the system, the database proxy is configured to identify that the SQL response from the first SQL query request is stored in the cache responsive to receiving from one of the plurality of clients a second SQL query request comprising the SQL query of the first SQL query request.

In some embodiments, the database proxy is configured to serve the SQL response from the cache responsive to the second SQL query request.

In some embodiments, the cache maintains SQL responses in the cache via a hash of two or more of the following: username, database name, character set and client version.

In some embodiments, the policy engine is configured to identify that an expression of the rule matches SQL content of the first SQL query request.

In some embodiments, the policy engine is configured to identify that the cache action of the policy specifies an action of one of to store to cache, not cache or invalidate a corresponding cache entry.

In some embodiments, the device is configured to store the SQL response to the cache responsive to the cache action of the policy specifying an action to cache.

In some embodiments, the device is configured to invalidate the SQL response stored in the cache responsive to the cache action of the policy specifying an action to invalidate.

In some embodiments, the policy engine is configured to identify that the policy specifies a selector for identifying a group of content to which the policy applies.

In some embodiments, the device is configured to perform the cache action of the policy on the group of content identified by the selector.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 7C is a block diagram of one embodiment of a method for selecting by an intermediary device a database from a plurality of databases to forward a structured query language (SQL) query request;

Figure 1A:
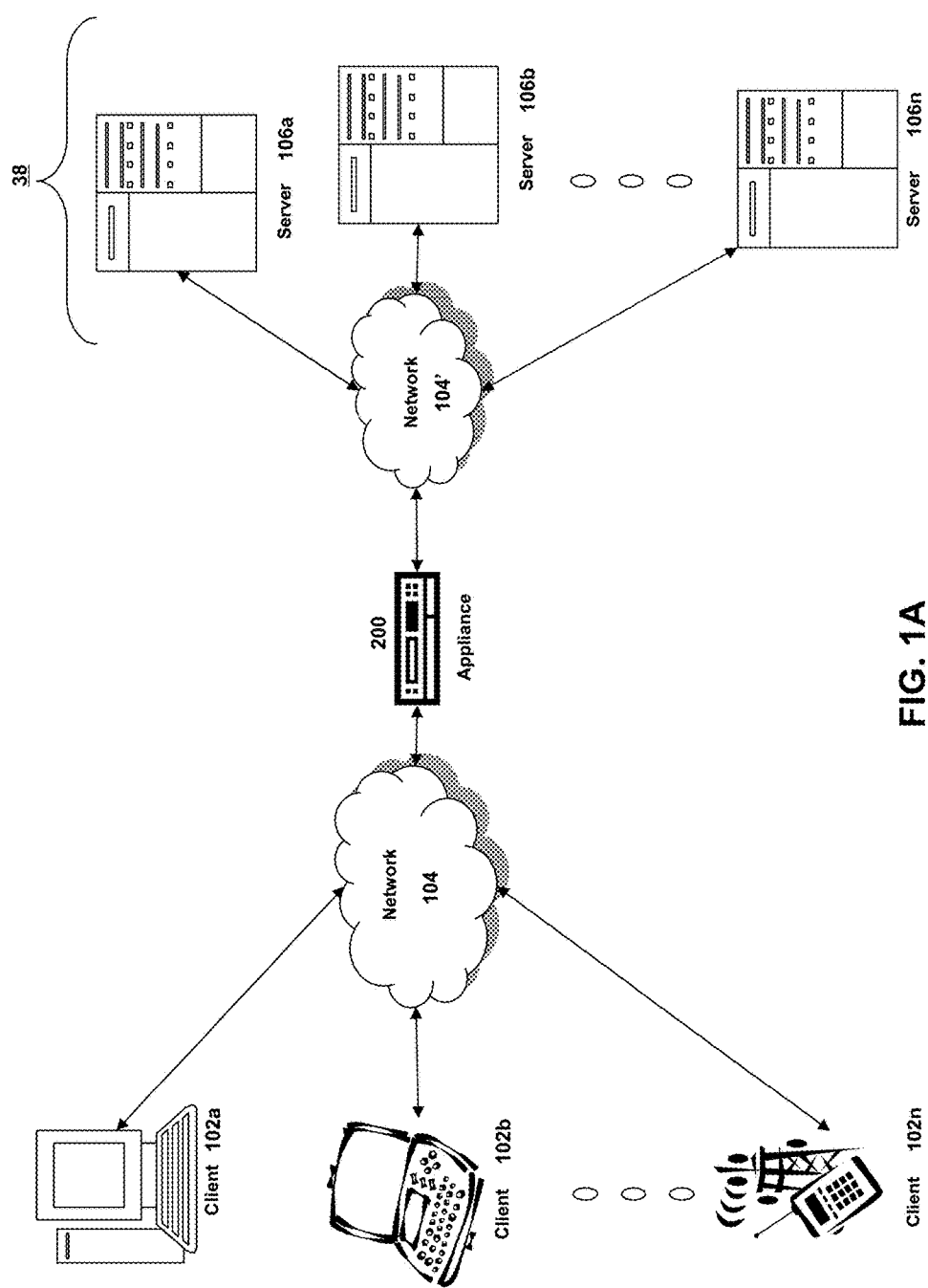
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment;

Section F describes embodiments of systems and methods for providing a clustered appliance architecture environment; and Section G describes embodiments of systems and methods for providing database proxying services; and Section H describes embodiments of systems and methods for integrated SQL caching.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
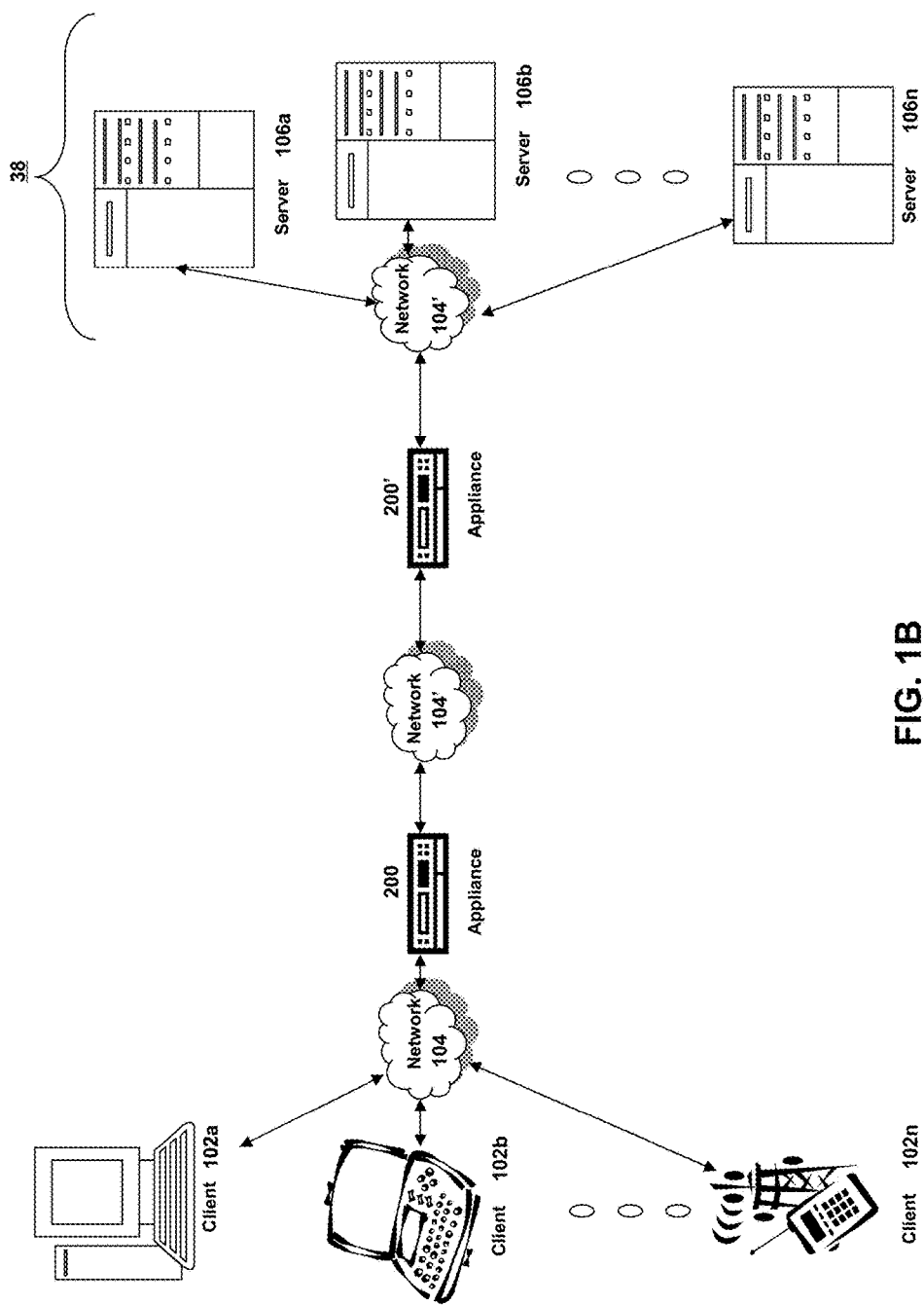
FIG. 1B is a block diagram of an embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1C:
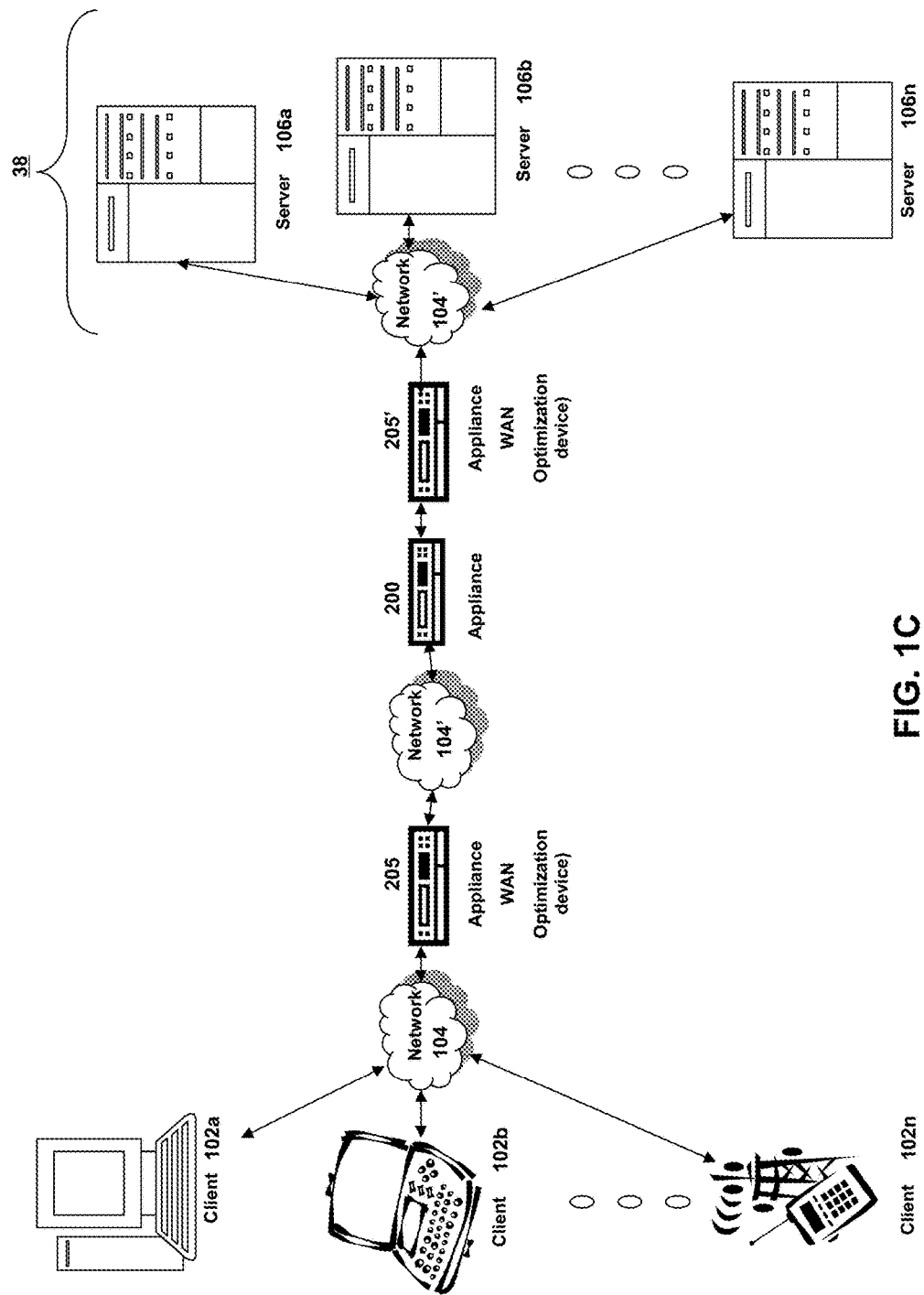
FIG. 1C is a block diagram of another embodiment of an environment for delivering a computing environment from a server to a client via an appliance.
Figure 1D:
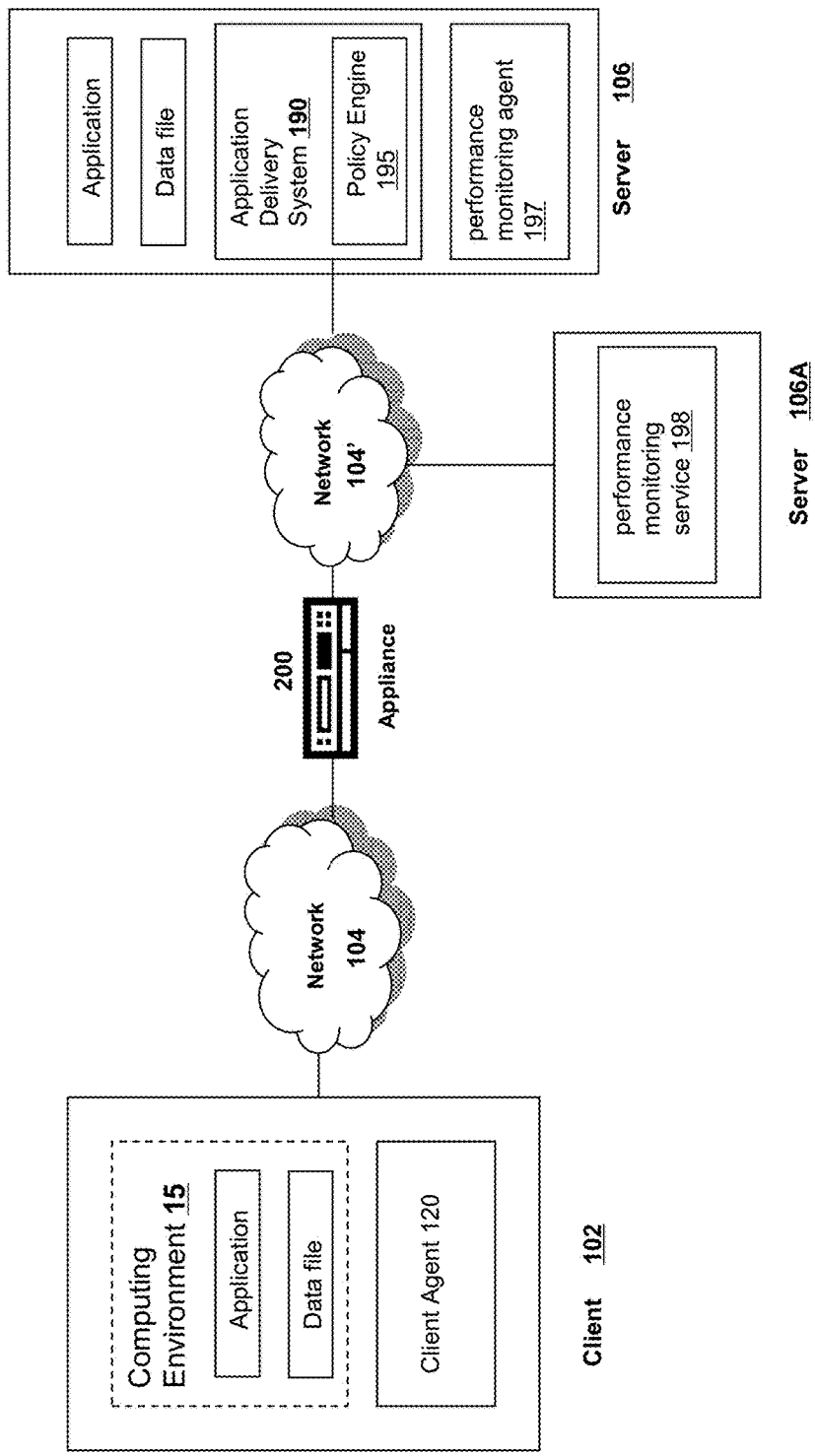
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
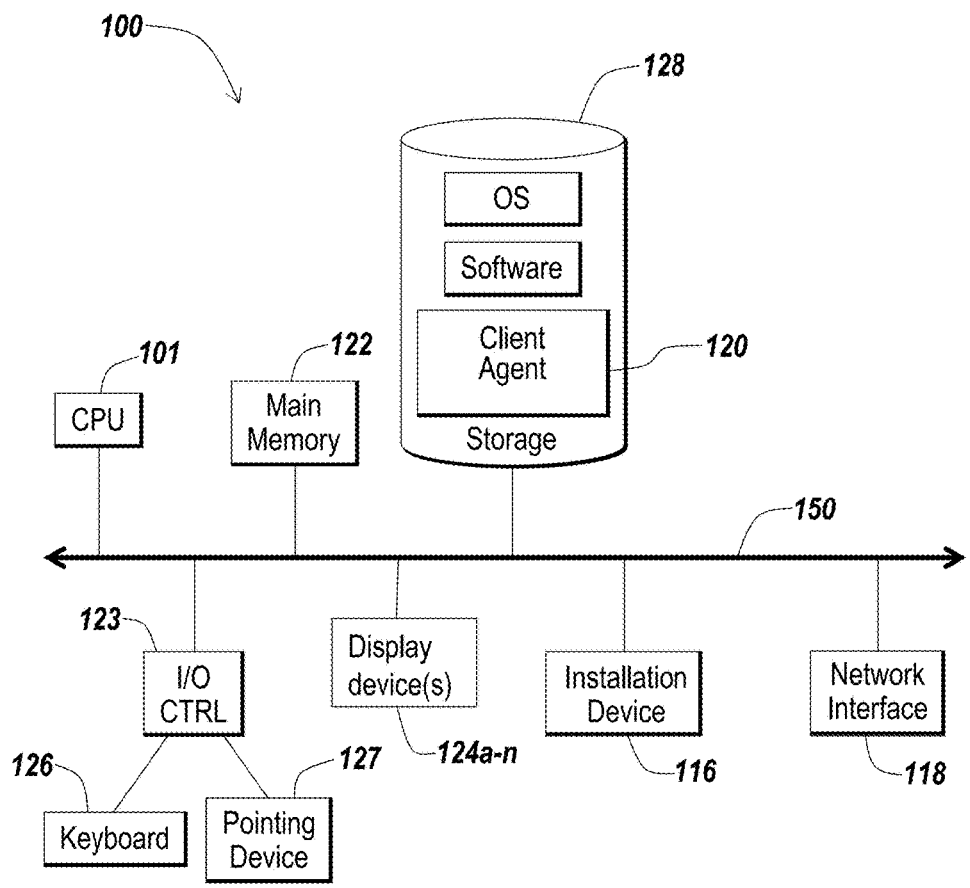
FIGS. 1E-1H are block diagrams of embodiments of a computing device.
Figure 1F:
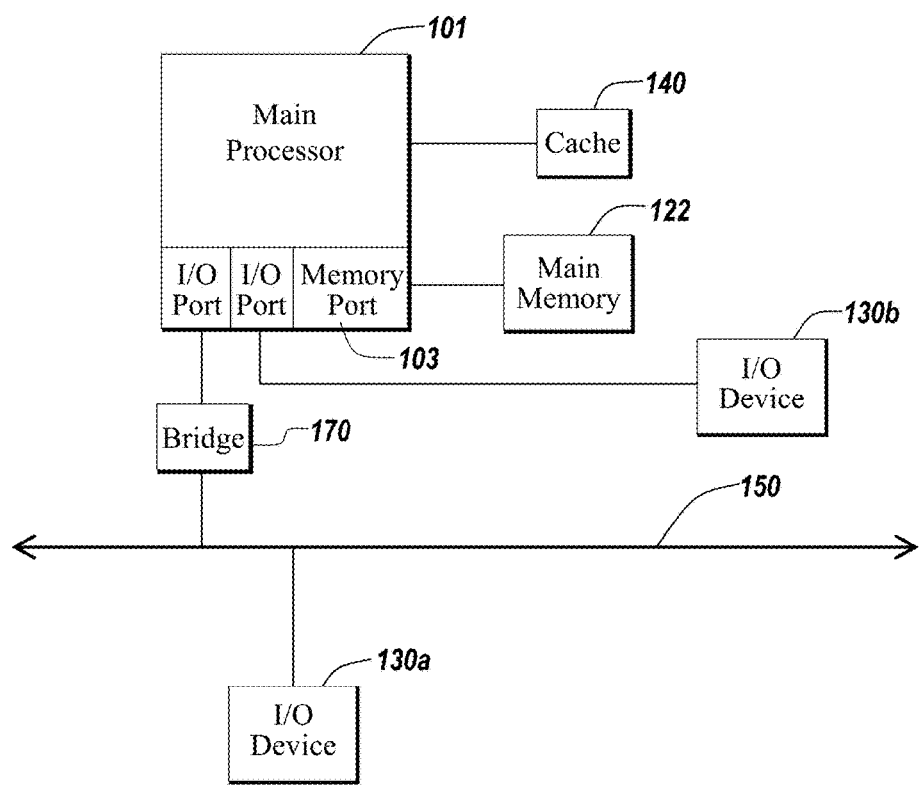

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130*b* via HyperTransport, Rapid I/O, or InfiniBand. FIG. 1F also depicts an embodiment in which local busses and direct communication are mixed: the processor 101 communicates with I/O device 130*b* using a local interconnect bus while communicating with I/O device 130*a* directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130*a*-130*n* may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
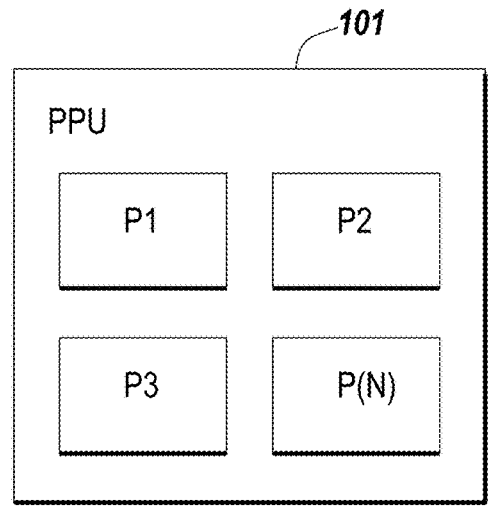

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
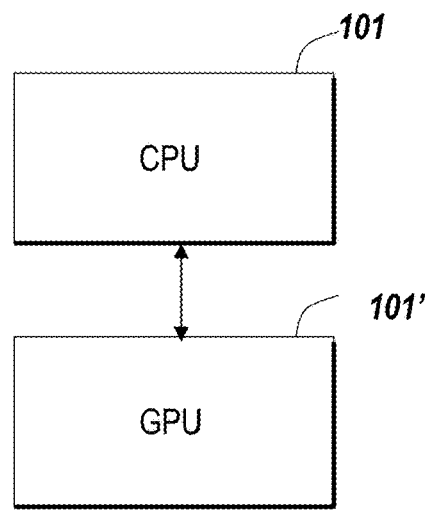

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
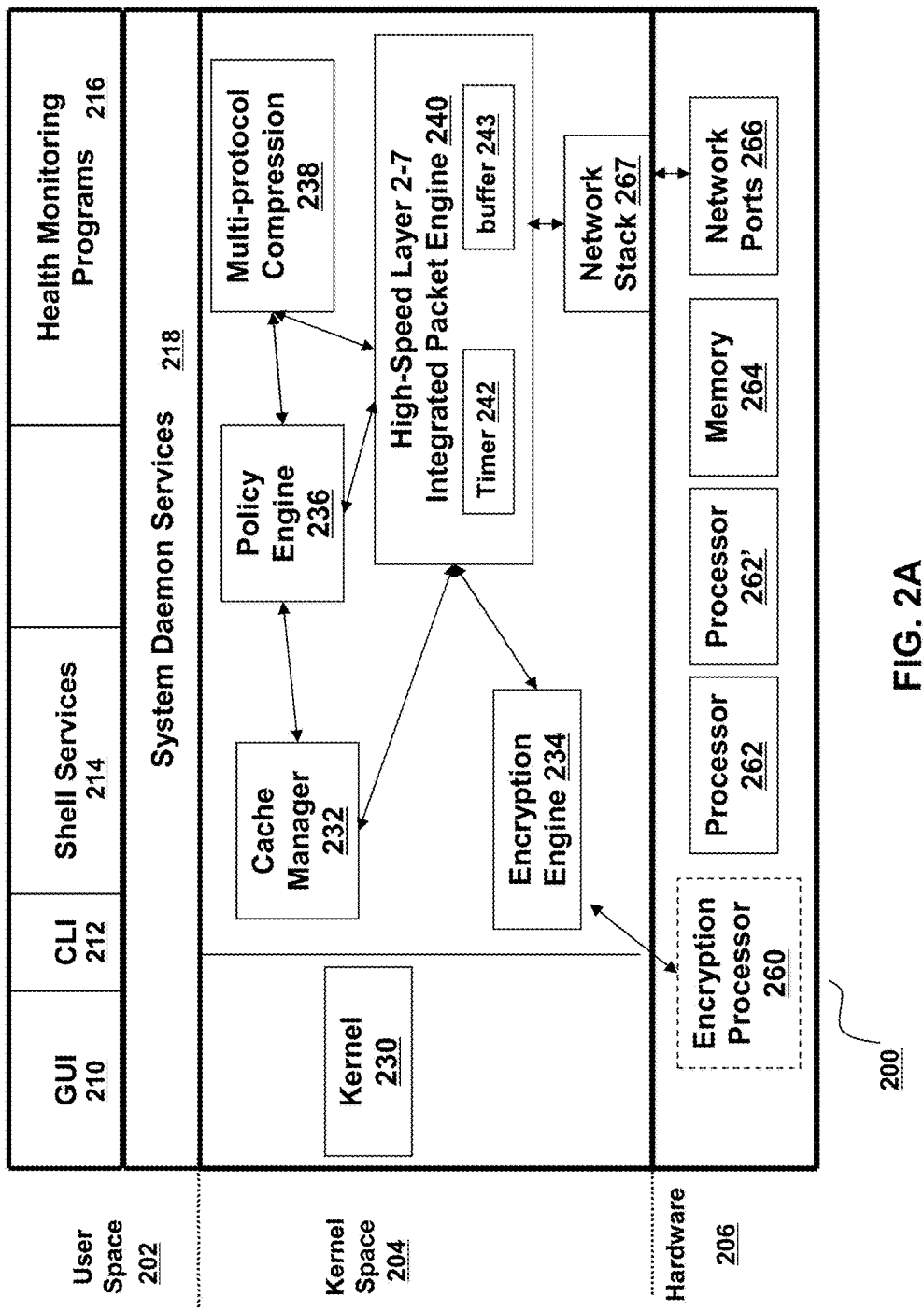
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), Hyper-Text Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
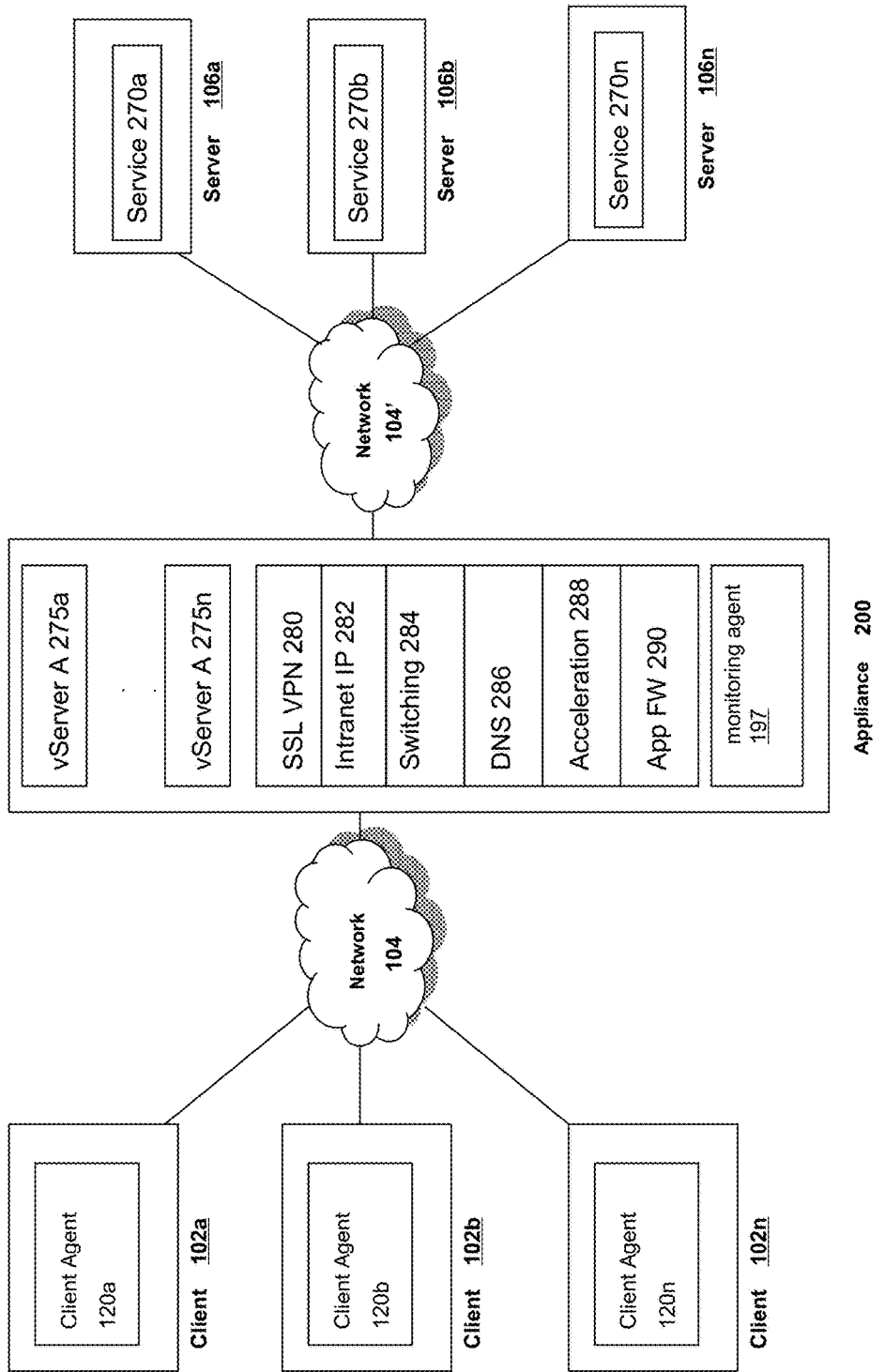
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
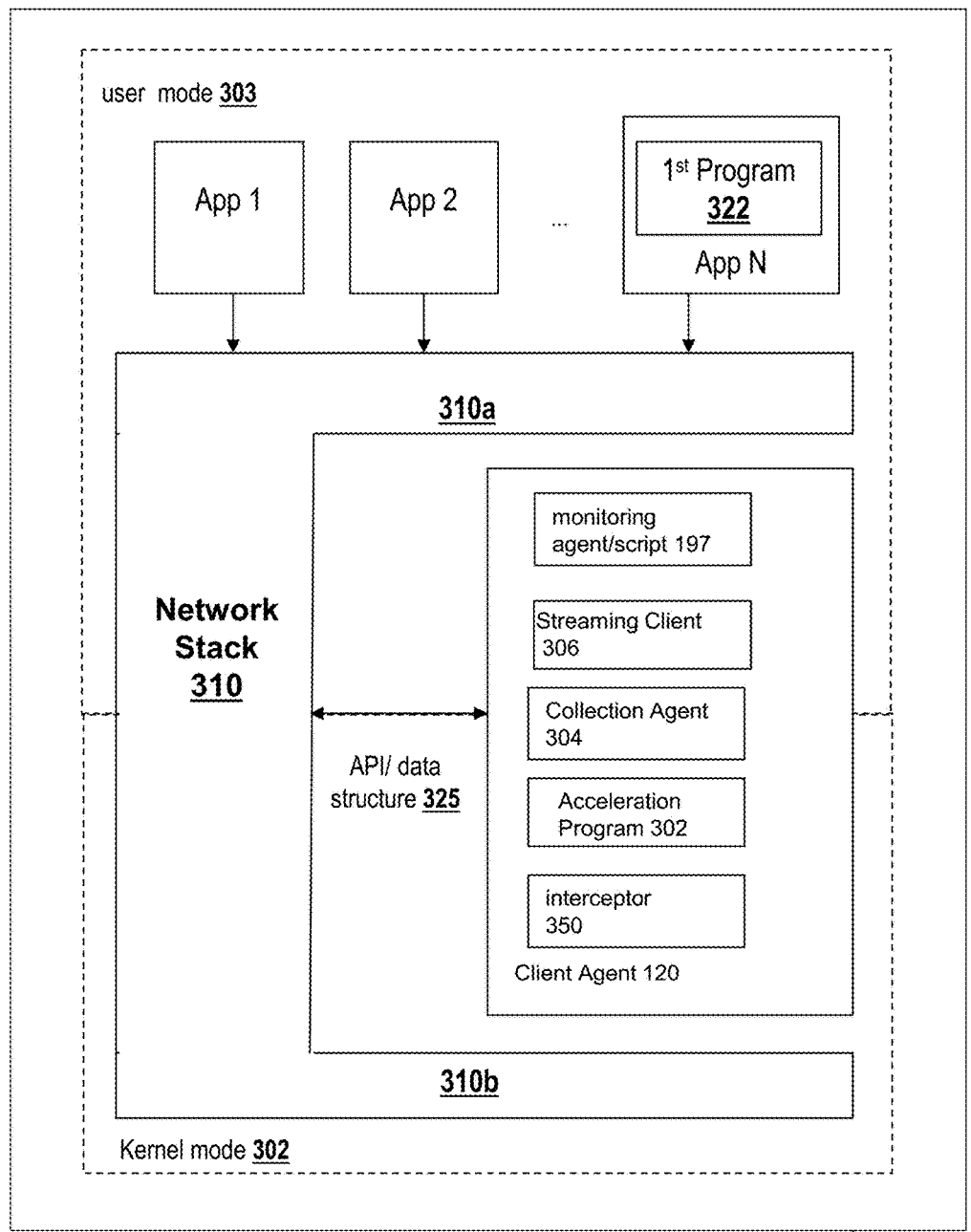
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2)

transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
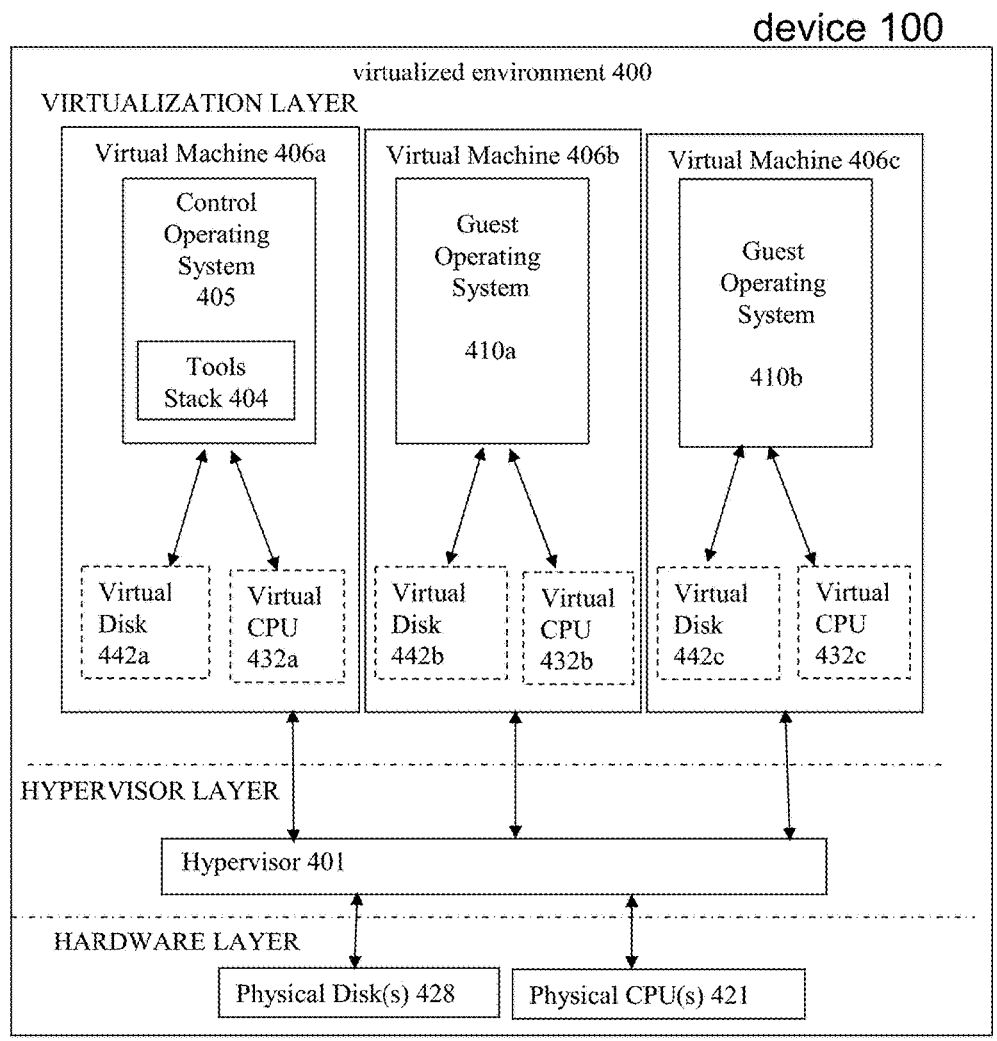
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
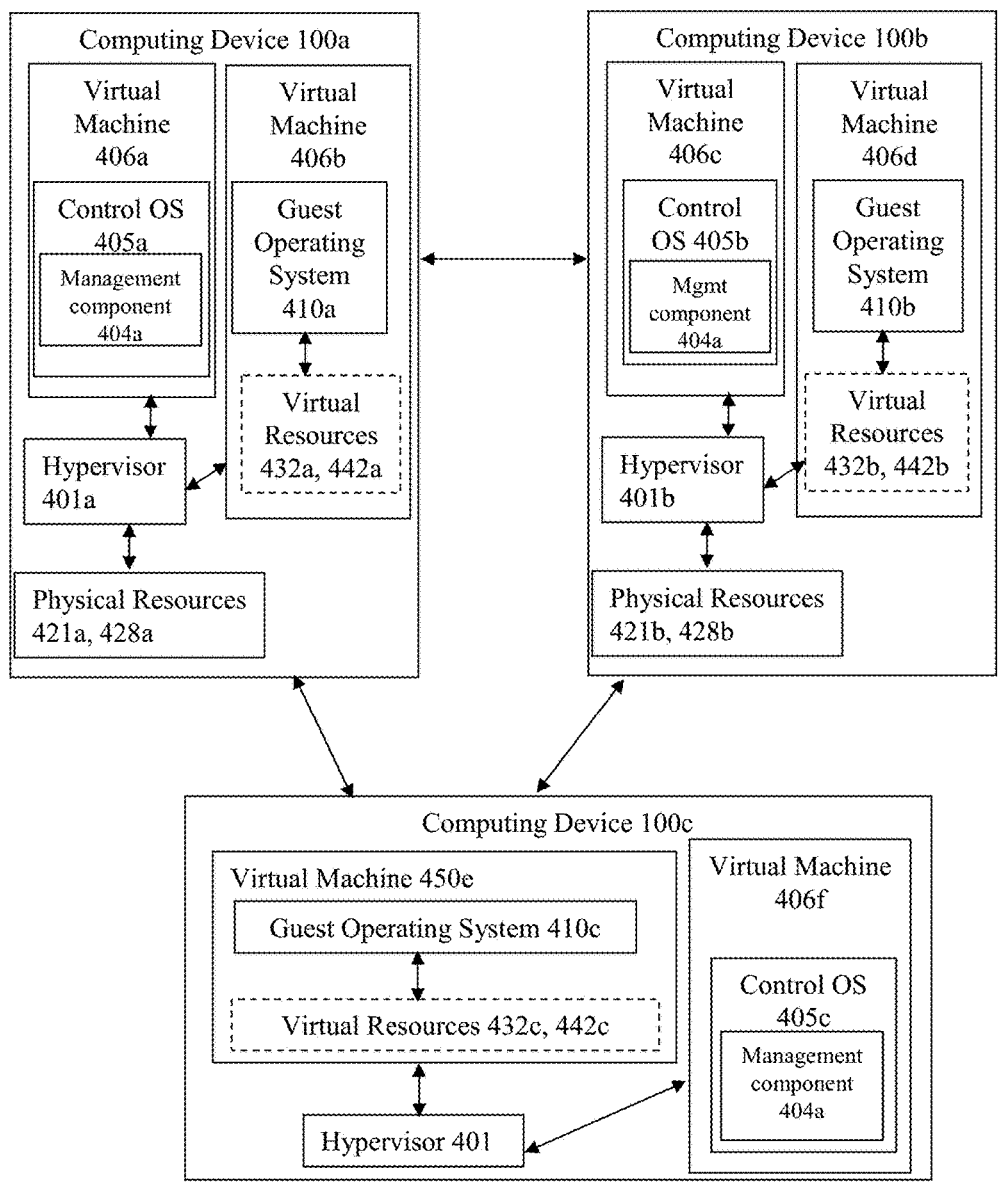
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
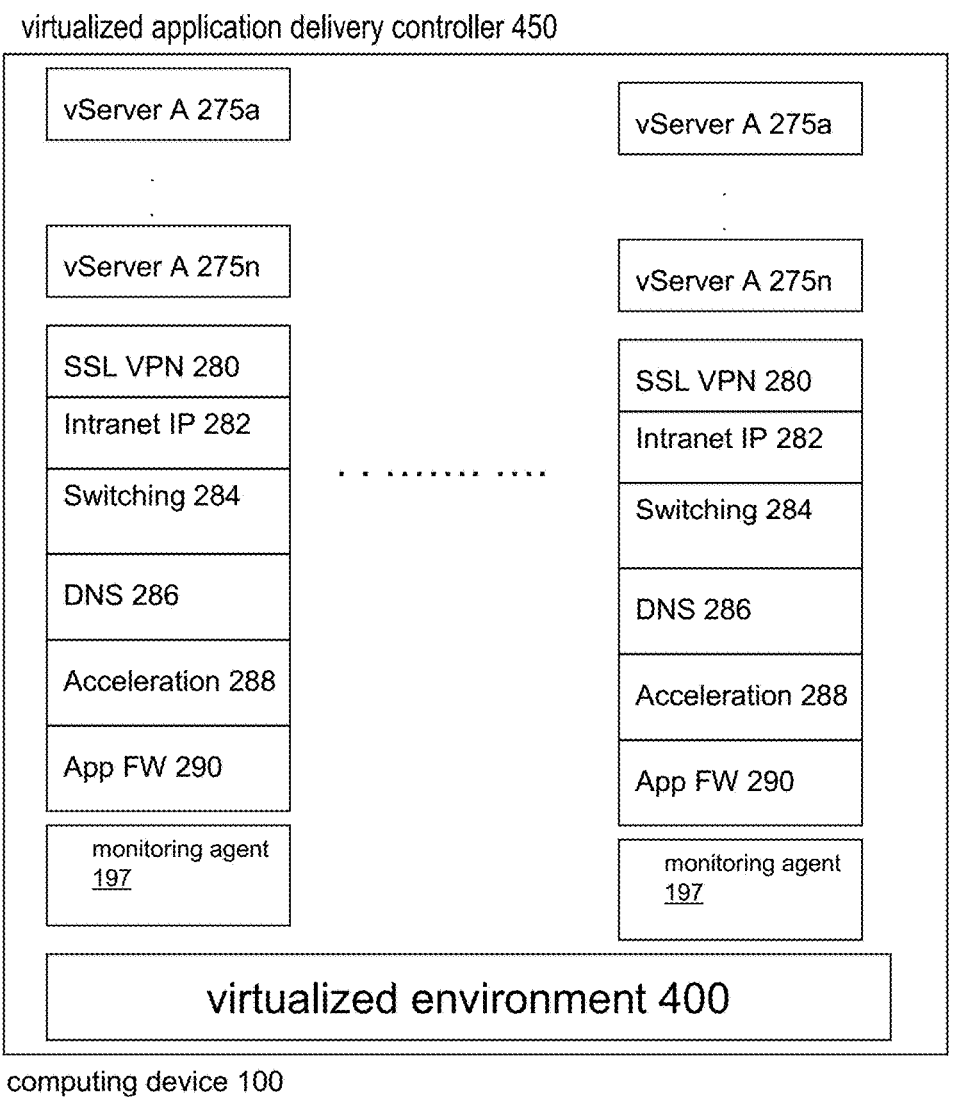
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
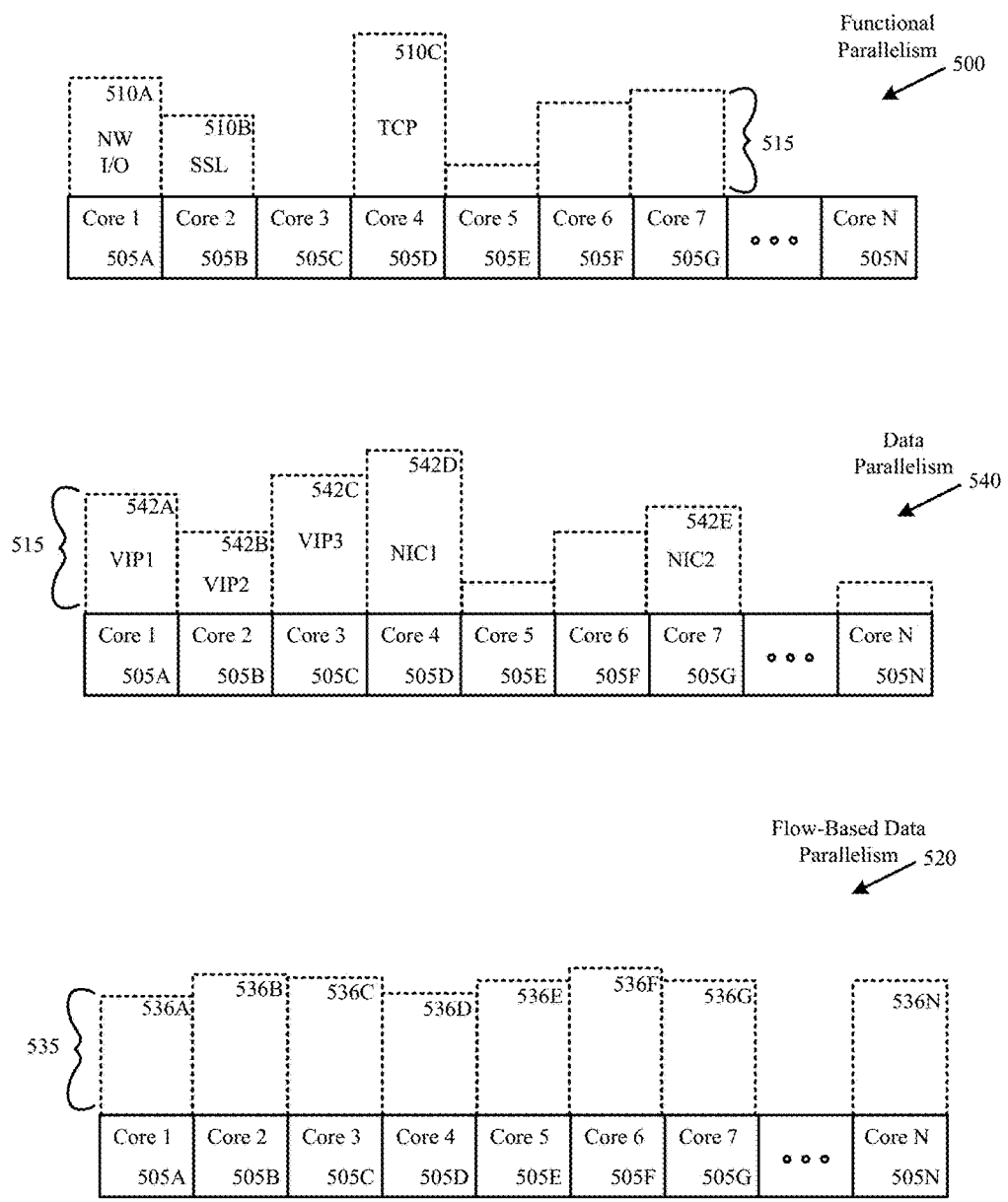
FIG. 5A are block diagrams of embodiments of approaches to implementing parallelism in a multi-core system.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

Figure 5B:
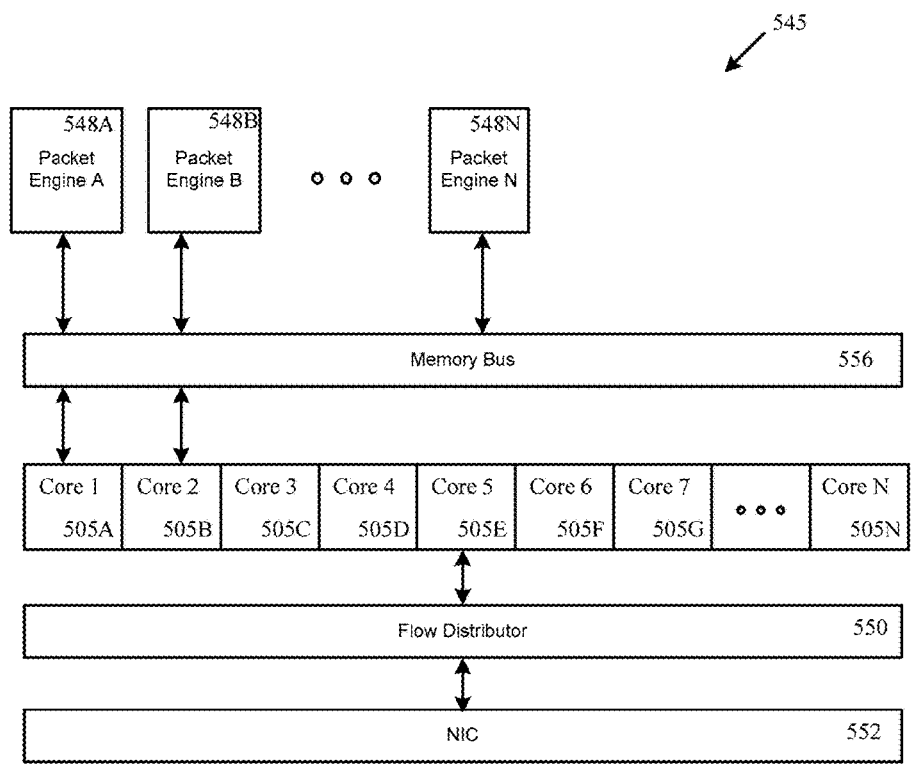
FIG. 5B is a block diagram of an embodiment of a system utilizing a multi-core system.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance. The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, require that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505. The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

- 4-tuple of source TCP Port, source IP version 4 (IPv4) address, destination TCP Port, and destination IPv4 address.
- 4-tuple of source TCP Port, source IP version 6 (IPv6) address, destination TCP Port, and destination IPv6 address.
- 2-tuple of source IPv4 address, and destination IPv4 address.
- 2-tuple of source IPv6 address, and destination IPv6 address.
- 2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
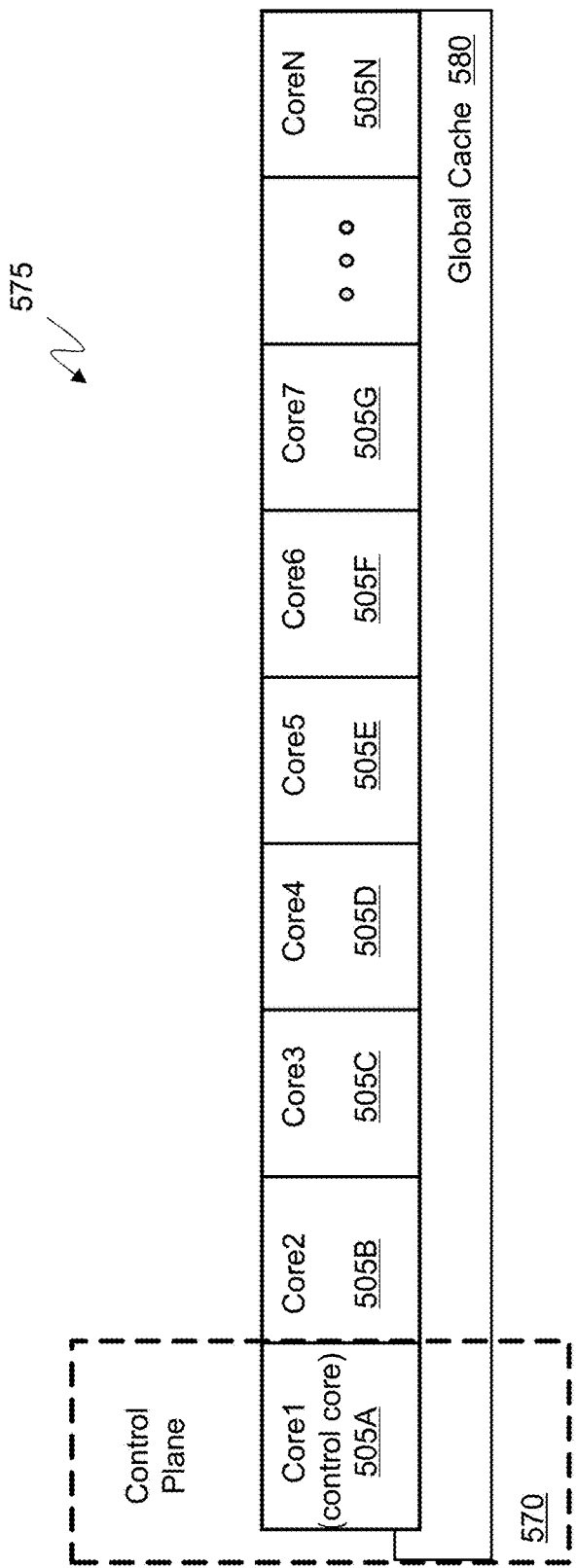
FIG. 5C is a block diagram of another embodiment of an aspect of a multi-core system.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Providing a Distributed Cluster Architecture

As discussed in the previous section, to overcome limitations on transistor spacing and CPU speed increases, many CPU manufacturers have incorporated multi-core CPUs to improve performance beyond that capable of even a single, higher speed CPU. Similar or further performance gains may be made by operating a plurality of appliances, either single or multi-core, together as a distributed or clustered appliance. Individual computing devices or appliances may be referred to as nodes of the cluster. A centralized management system may perform load balancing, distribution, configuration, or other tasks to allow the nodes to operate in conjunction as a single computing system. Externally or to other devices, including servers and clients, in many embodiments, the cluster may be viewed as a single virtual appliance or computing device, albeit one with performance exceeding that of a typical individual appliance.

Figure 6:
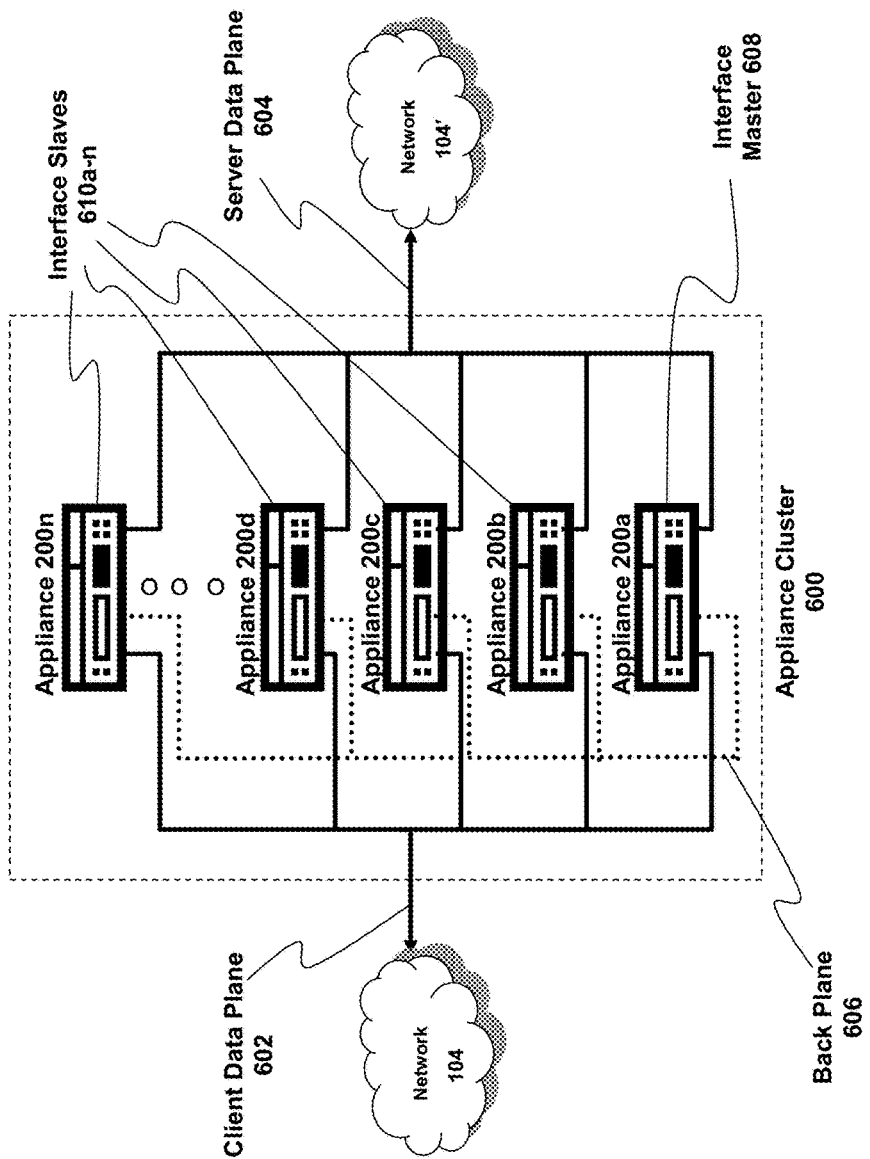
FIG. 6 is a block diagram of an embodiment of a cluster system.

Referring now to FIG. 6, illustrated is an embodiment of a computing device cluster or appliance cluster 600. A plurality of appliances 200a-200n or other computing devices, sometimes referred to as nodes, such as desktop computers, servers, rackmount servers, blade servers, or any other type and form of computing device may be joined into a single appliance cluster 600. Although referred to as an appliance cluster, in many embodiments, the cluster may operate as an application server, network storage server, backup service, or any other type of computing device without limitation. In many embodiments, the appliance cluster 600 may be used to perform many of the functions of appliances 200, WAN optimization devices, network acceleration devices, or other devices discussed above.

In some embodiments, the appliance cluster 600 may comprise a homogenous set of computing devices, such as identical appliances, blade servers within one or more chassis, desktop or rackmount computing devices, or other devices. In other embodiments, the appliance cluster 600 may comprise a heterogeneous or mixed set of devices, including different models of appliances, mixed appliances and servers, or any other set of computing devices. This may allow for an appliance cluster 600 to be expanded or upgraded over time with new models or devices, for example.

In some embodiments, each computing device or appliance 200 of an appliance cluster 600 may comprise a multi-core appliance, as discussed above. In many such embodiments, the core management and flow distribution methods discussed above may be utilized by each individual appliance, in addition to the node management and distribution methods discussed herein. This may be thought of as a two-tier distributed system, with one appliance comprising and distributing data to multiple nodes, and each node comprising and distributing data for processing by multiple cores. Accordingly, in such embodiments, the node distribution system need not manage flow distribution to individual cores, as that may be taken care of by a master or control core as discussed above.

In many embodiments, an appliance cluster 600 may be physically grouped, such as a plurality of blade servers in a chassis or plurality of rackmount devices in a single rack, but in other embodiments, the appliance cluster 600 may be distributed in a plurality of chassis, plurality of racks, plurality of rooms in a data center, plurality of data centers, or any other physical arrangement. Accordingly, the appliance cluster 600 may be considered a virtual appliance, grouped via common configuration, management, and purpose, rather than a physical group.

In some embodiments, an appliance cluster 600 may be connected to one or more networks 104, 104'. For example, referring briefly back to FIG. 1A, in some embodiments, an appliance 200 may be deployed between a network 104 joined to one or more clients 102, and a network 104' joined to one or more servers 106. An appliance cluster 600 may be similarly deployed to operate as a single appliance. In many embodiments, this may not require any network topology changes external to appliance cluster 600, allowing for ease of installation and scalability from a single appliance scenario. In other embodiments, an appliance cluster 600 may be similarly deployed as shown in FIGS. 1B-1D or discussed above. In still other embodiments, an appliance cluster may comprise a plurality of virtual machines or processes executed by one or more servers. For example, in one such embodiment, a server farm may execute a plurality of virtual machines, each virtual machine configured as an appliance 200, and a plurality of the virtual machines acting in concert as an appliance cluster 600. In yet still other embodiments, an appliance cluster 600 may comprise a mix of appliances 200 or virtual machines configured as appliances 200. In some embodiments, appliance cluster 600 may be geographically distributed, with the plurality of appliances 200 not co-located. For example, referring back to FIG. 6, in one such embodiment, a first appliance 200a may be located at a first site, such as a data center and a second appliance 200b may be located at a second site, such as a central office or corporate headquarters. In a further embodiment, such geographically remote appliances may be joined by a dedicated network, such as a T1 or T3 point-to-point connection; a VPN; or any other type and form of network. Accordingly, although there may be additional communications latency compared to co-located appliances 200a-200b, there may be advantages in reliability in case of site power failures or communications outages, scalability, or other benefits. In some embodiments, latency issues may be reduced through geographic or network-based distribution of data flows. For example, although configured as an appliance cluster 600, communications from clients and servers at the corporate headquarters may be directed to the appliance 200b deployed at the site, load balancing may be weighted by location, or similar steps can be taken to mitigate any latency.

Still referring to FIG. 6, an appliance cluster 600 may be connected to a network via a client data plane 602. In some embodiments, client data plane 602 may comprise a communication network, such as a network 104, carrying data between clients and appliance cluster 600. In some embodiments, client data plane 602 may comprise a switch, hub, router, or other network devices bridging an external network 104 and the plurality of appliances 200a-200n of the appliance cluster 600. For example, in one such embodiment, a router may be connected to an external network 104, and connected to a network interface of each appliance 200a-200n. In some embodiments, this router or switch may be referred to as an interface manager, and may further be configured to distribute traffic evenly across the nodes in the application cluster 600. Thus, in many embodiments, the interface master may comprise a flow distributor external to appliance cluster 600. In other embodiments, the interface master may comprise one of appliances 200a-200n. For example, a first appliance 200a may serve as the interface master, receiving incoming traffic for the appliance cluster 600 and distributing the traffic across each of appliances 200b-200n. In some embodiments, return traffic may similarly flow from each of appliances 200b-200n via the first appliance 200a serving as the interface master. In other embodiments, return traffic from each of appliances 200b-200n may be transmitted directly to a network 104, 104', or via an external router, switch, or other device. In some embodiments, appliances 200 of the appliance cluster not serving as an interface master may be referred to as interface slaves.

The interface master may perform load balancing or traffic flow distribution in any of a variety of ways. For example, in some embodiments, the interface master may comprise a router performing equal-cost multi-path (ECMP) routing with next hops configured with appliances or nodes of the cluster. The interface master may use an open-shortest path first (OSPF) In some embodiments, the interface master may use a stateless hash-based mechanism for traffic distribution, such as hashes based on IP address or other packet information tuples, as discussed above. Hash keys and/or salt may be selected for even distribution across the nodes. In other embodiments, the interface master may perform flow distribution via link aggregation (LAG) protocols, or any other type and form of flow distribution, load balancing, and routing.

In some embodiments, the appliance cluster 600 may be connected to a network via a server data plane 604. Similar to client data plane 602, server data plane 604 may comprise a communication network, such as a network 104', carrying data between servers and appliance cluster 600. In some embodiments, server data plane 604 may comprise a switch, hub, router, or other network devices bridging an external network 104' and the plurality of appliances 200a-200n of the appliance cluster 600. For example, in one such embodiment, a router may be connected to an external network 104', and connected to a network interface of each appliance 200a-200n. In many embodiments, each appliance 200a-200n may comprise multiple network interfaces, with a first network interface connected to client data plane 602 and a second network interface connected to server data plane 604. This may provide additional security and prevent direct interface of client and server networks by having appliance cluster 600 server as an intermediary device. In other embodiments, client data plane 602 and server data plane 604 may be merged or combined. For example, appliance cluster 600 may be deployed as a non-intermediary node on a network with clients 102 and servers 106. As discussed above, in many embodiments, an interface master may be deployed on the server data plane 604, for routing and distributing communications from the servers and network 104' to each appliance of the appliance cluster. In many embodiments, an interface master for client data plane 602 and an interface master for server data plane 604 may be similarly configured, performing ECMP or LAG protocols as discussed above.

In some embodiments, each appliance 200a-200n in appliance cluster 600 may be connected via an internal communication network or back plane 606. Back plane 606 may comprise a communication network for inter-node or inter-appliance control and configuration messages, and for inter-node forwarding of traffic. For example, in one embodiment in which a first appliance 200a communicates with a client via network 104, and a second appliance 200b communicates with a server via network 104', communications between the client and server may flow from client to first appliance, from first appliance to second appliance via back plane 606, and from second appliance to server, and vice versa. In other embodiments, back plane 606 may carry configuration messages, such as interface pause or reset commands; policy updates such as filtering or compression policies; status messages such as buffer status, throughput, or error messages; or any other type and form of inter-node communication. In some embodiments, RSS keys or hash keys may be shared by all nodes in the cluster, and may be communicated via back plane 606. For example, a first node or master node may select an RSS key, such as at startup or boot, and may distribute this key for use by other nodes. In some embodiments, back plane 606 may comprise a network between network interfaces of each appliance 200, and may comprise a router, switch, or other network device (not illustrated). Thus, in some embodiments and as discussed above, a router for client data plane 602 may be deployed between appliance cluster 600 and network 104, a router for server data plane 604 may be deployed between appliance cluster 600 and network 104', and a router for back plane 606 may be deployed as part of appliance cluster 600. Each router may connect to a different network interface of each appliance 200. In other embodiments, one or more planes 602-606 may be combined, or a router or switch may be split into multiple LANs or VLANs to connect to different interfaces of appliances 200a-200n and serve multiple routing functions simultaneously, to reduce complexity or eliminate extra devices from the system.

In some embodiments, a control plane (not illustrated) may communicate configuration and control traffic from an administrator or user to the appliance cluster 600. In some embodiments, the control plane may be a fourth physical network, while in other embodiments, the control plane may comprise a VPN, tunnel, or communication via one of planes 602-606. Thus, the control plane may, in some embodiments, be considered a virtual communication plane. In other embodiments, an administrator may provide configuration and control through a separate interface, such as a serial communication interface such as RS-232; a USB communication interface; or any other type and form of communication. In some embodiments, an appliance 200 may comprise an interface for administration, such as a front panel with buttons and a display; a web server for configuration via network 104, 104' or back plane 606; or any other type and form of interface.

In some embodiments, as discussed above, appliance cluster 600 may include internal flow distribution. For example, this may be done to allow nodes to join/leave transparently to external devices. To prevent an external flow distributor from needing to be repeatedly reconfigured on such changes, a node or appliance may act as an interface master or distributor for steering network packets to the correct node within the cluster 600. For example, in some embodiments, when a node leaves the cluster (such as on failure, reset, or similar cases), an external ECMP router may identify the change in nodes, and may rehash all flows to redistribute traffic. This may result in dropping and resetting all connections. The same drop and reset may occur when the node rejoins. In some embodiments, for reliability, two appliances or nodes within appliance cluster 600 may receive communications from external routers via connection mirroring.

In many embodiments, flow distribution among nodes of appliance cluster 600 may use any of the methods discussed above for flow distribution among cores of an appliance. For example, in one embodiment, a master appliance, master node, or interface master, may compute a RSS hash, such as a Toeplitz hash on incoming traffic and consult a preference list or distribution table for the hash. In many embodiments, the flow distributor may provide the hash to the recipient appliance when forwarding the traffic. This may eliminate the need for the node to recompute the hash for flow distribution to a core. In many such embodiments, the RSS key used for calculating hashes for distribution among the appliances may comprise the same key as that used for calculating hashes for distribution among the cores, which may be referred to as a global RSS key, allowing for reuse of the calculated hash. In some embodiments, the hash may be computed with input tuples of transport layer headers including port numbers, internet layer headers including IP addresses; or any other packet header information. In some embodiments, packet body information may be utilized for the hash. For example, in one embodiment in which traffic of one protocol is encapsulated within traffic of another protocol, such as lossy UDP traffic encapsulated via a lossless TCP header, the flow distributor may calculate the hash based on the headers of the encapsulated protocol (e.g. UDP headers) rather than the encapsulating protocol (e.g. TCP headers). Similarly, in some embodiments in which packets are encapsulated and encrypted or compressed, the flow distributor may calculate the hash based on the headers of the payload packet after decryption or decompression. In still other embodiments, nodes may have internal IP addresses, such as for configuration or administration purposes. Traffic to these IP addresses need not be hashed and distributed, but rather may be forwarded to the node owning the destination address. For example, an appliance may have a web server or other server running for configuration or administration purposes at an IP address of 1.2.3.4, and, in some embodiments, may register this address with the flow distributor as it's internal IP address. In other embodiments, the flow distributor may assign internal IP addresses to each node within the appliance cluster 600. Traffic arriving from external clients or servers, such as a workstation used by an administrator, directed to the internal IP address of the appliance (1.2.3.4) may be forwarded directly, without requiring hashing.

G. Systems and Methods for Database Proxying

Figure 7A:
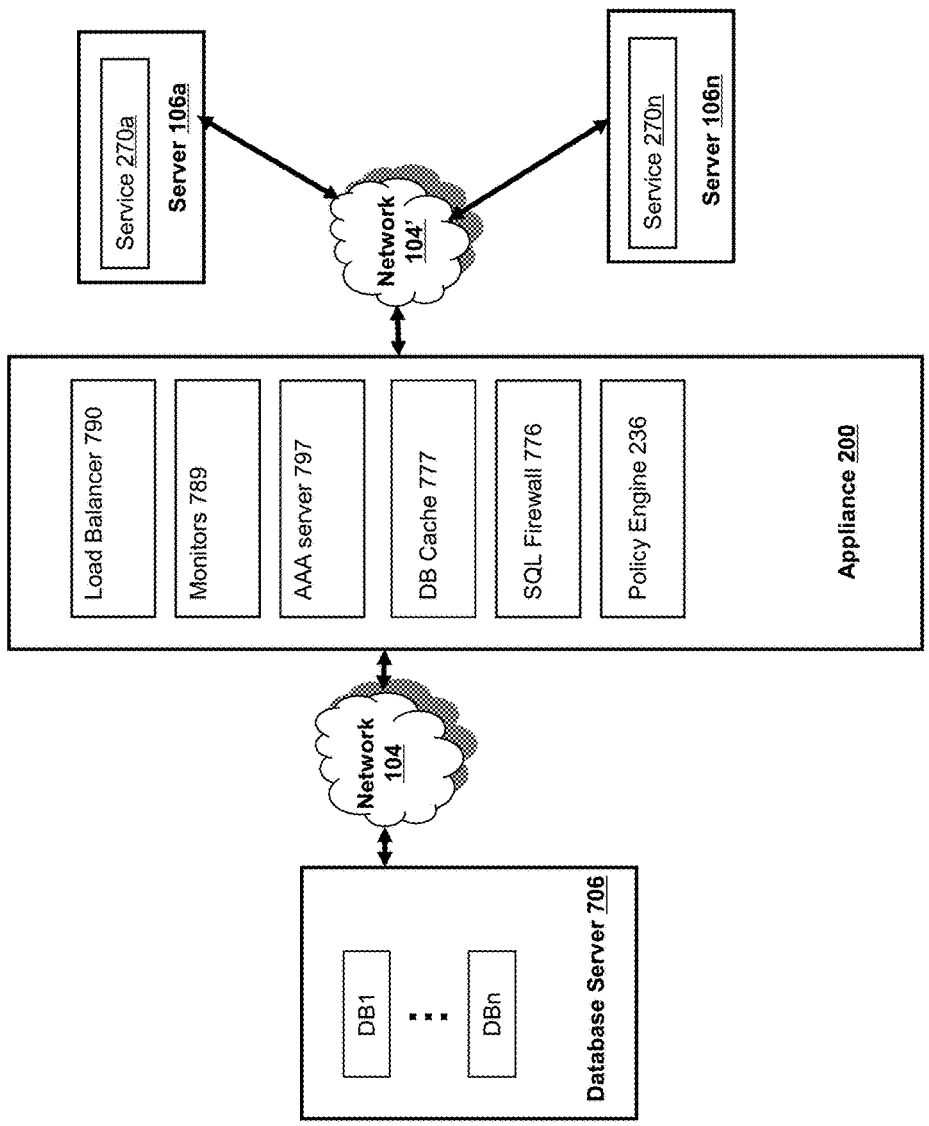
FIG. 7A is a block diagram of one embodiment of a system for selecting by an intermediary device a database from a plurality of databases to forward a structured query language (SQL) query request.

Referring now to FIG. 7A, a system for providing database proxy services between one or more database servers and one or more application servers is depicted. An intermediary device of the system, such as an appliance, may select a database from a plurality of databases to forward a structured query language (SQL) query request based on a property of the SQL request. In brief summary, the appliance 200 may provide a plurality of services for facilitating and processing communications with databases or database servers 706, including but not limited to load balancing 790, health monitoring 789, authorization, authentication and auditing (AAA) 797, database caching 777, SQL firewall 776, content switching and policy-based transactions. In some embodiments, specialized network services available to web servers and application servers may be adapted to support a plurality of databases or database servers. For example, the packet switching system of an appliance may be configured or adapted to support database protocols, such as SQL, so as to provide some or all of these services.

The load balancer and/or content switching module may include any embodiments of the switching features 284 described in embodiments of FIGS. 2B and 4C. The load balancer may include any embodiments of a vServer 175 to provide switching and/or load balancing functionality. In any of these embodiments, the switching 284 and/or vServer 275 may be designed and/or constructed to perform any of the database proxying, switching and load balancing functionality described herein. In some embodiments, the load balancer manages switching between databases based on application of one or more policies and policy expressions on a database request or query. Similarly, the appliance may provide content switching between databases, database servers and/or connections based on application of one or more policies and policy expressions. For example and in one embodiment, a policy engine of the appliance may apply one or more policies on a received database message, such as a SQL query. A policy expression may, for example, parse or identify properties or parameters, such as user information, from the query and direct the query to a connection previously established (e.g., for the user) to a database. Thus, by using policy expressions, the appliance may be able to support user persistence for database communications with respect to a database connection, database, database server, and/or core of the multi-core system. The appliance can similarly use policy expressions to maintain persistence with respect to a database, database server, database connection, etc.

The health monitoring module 789 may be designed and configured to support, provide and implement health monitoring of database services, database servers and/or databases by the appliance 200 as described herein. The health monitors, in communication with one or more database services, database servers and/or databases, may transmit and/or receive messages using SQL or other database-based communications. The appliance may perform health monitoring based on policies and/or policy expressions. For example, policy expressions may identify a database protocol, user, or other information for monitoring related to a particular query, set of queries, user, connection, database, protocol, and/or database server. The appliance may provide health monitoring for various aspects of database communication and transaction by executing one or more vservers on the appliance. The appliance may associate one or more health monitoring policies to each of these vservers.

The SQL firewall may be part of or include any embodiment of the AppFW described herein, such as any embodiment of the AppFw 290 of FIGS. 2B and 4C. The SQL firewall may be designed and constructed to perform checking and protection of database communications traversing the appliance 200, such as checking SQL queries and responses. The SQL firewall may allow, deny, filter, redirect or otherwise process database communications responsive to applying one or more firewall policies.

The database caching may include any embodiments of caching described herein, including but not limited to the cache management 232 functionality described in conjunction with FIG. 2A. The cache management of the appliance may be designed and constructed to cache database-related objects, SQL queries and responses as described herein. The database caching may cache selected content based on one or more policies applied to a database query or data transfer.

A database server may be a server or program that provides database services to other computer programs or hardware devices. A database server may include and/or provide access to one or more databases. In some embodiments, a database server may be referred as a database. Database servers are sometimes referred to as database management systems (DBMS). Examples of database servers include Oracle, DB2, Informix, Ingres and Structured Query Language (SQL) servers. Although each server may use its own query logic and/or structure, the SQL query language may be more or less the same across most database servers. Each database server may support one or more databases. A database server may include one or more features of a server 106 and/or client 102, for example, embodiments of servers and clients described above in connection with FIGS. 1A-1F, 2B, 3 and 4A-4C.

A database may include one or more storage devices that supports particular data structures for holding information. In some embodiments, a database or database server may include a storage area network (SAN). By way of illustration, some of the commonly-deployed databases include MYSQL (e.g., open source), MICROSOFT SQL Server (e.g., popular with small to medium enterprises), Oracle (e.g., common in mission-critical deployments), PostgreSQL and DB2.

One or more servers or application servers 106 may be in communication with a database server 706 over one or more networks 104, 104'. An application server may request data from a database server, or may send data to a database for storage. An application server may include one or more features of various embodiments of a server 106 or client 102, for example, embodiments of servers 106 and clients described above in connection with FIGS. 1A-1F, 2B, 3 and 4A-4C.

An intermediary device 200 or appliance 200 may support or facilitate communications between a server 106 and a database server 706, e.g., by providing one or more specialized services. These specialized services may be directed to supporting particular database protocols and/or data transfer or access characteristics. In brief overview, the appliance may support one or more of the following features or services, though not limited to: (1) Connection Multiplexing, which can allow requests from multiple client connections to share one or many server-side connections, and may further support load balancing, content switching and connection pooling features; (2) Load balancing, which may use request tracking to provide least-connection-based load balancing to equally load database servers, or use other load balancing mechanisms including custom-load-balancing; Content Switching may be deployed in a master/slave configuration to scale databases, e.g., parsing the SQL queries, and sending write queries (e.g., INSERT/UPDATE/DELETE) to the master and read queries to the slaves; properties of the SQL query may be exposed through application of one or more policies or policy expressions; (3) Monitors, which can be SNMP based and/or SQL query based, which may include TCP monitors and monitors which describe the health of each database and/or database server; (4) AAA, for example to provide a single audit point and/or provide authentication for funneling requests from a single client side connection to different server-side connections; (5) Caching which can optimize web applications, for example using memcached, which may or may not involve modifying the application; (6) SQL Firewall for providing features such as SQL injection prevention; and (7) other features such as Rewrite, Responder, Compression and SSL offload.

In various embodiments, a server 106 or client 102 accessing a database may use a protocol of the database to communicate with the database server 706. Each database may have its own protocol, although in certain cases, the SQL language is common between a plurality of databases. Some of these protocols may be built on top of TCP and may be connection-based. The protocol structure, features, parameters and characteristics may parallel HTTP to a certain extent. For example, SQL is also request-response based. SQL protocol communications may involve an initial handshake for exchanging capabilities and/or compatibilities in a client-server relationship. The handshake may also involve authentication of the "client". To support SQL protocol, the appliance may be configured to support properties associated with a client-server connection. Properties may be defined and/or configured for an authenticated user. One or more properties may be parsed from a query (e.g., SQL query) and/or identified based on the query. In some embodiments, an authenticated user is a user who has established a connection (e.g., client-server connection). Different permissions may be granted to different users. Accordingly, each connection may be associated with an authenticated user to prevent multiplexing of requests between different users. In a web application deployment, however, multiple clients (e.g., application servers) may have the same user. In using and supporting protocols like MYSQL, the appliance may be configured to change the user associated with a connection. The appliance may operate in a number of modes. In one mode, the client-side connection may be authenticated with respect to a user. In another mode, the appliance may operate and/or reside transparently between the client and the server.

Properties may be defined and/or configured for each database. Each database server may have the ability to host multiple databases. Each connection may be associated with a database. However, it may be undesirable or not possible for requests from different databases to be multiplexed on the same connection. The appliance may be configured to support creation of a connection without a database association. Such connections may be used to run commands which query the health of a server, for example. The appliance may be able to change the database associated with a connection.

Properties may be defined and/or configured with respect to client-server capabilities. Each connection may have or support one or more associated client-server capabilities or properties, for example server version, protocol version, compression, ssl, transactions, character set, etc. Each of these capabilities or properties may be associated with, or define a connection. The appliance may be configured to prevent multiplexing of requests of connections with different capabilities.

Properties may be defined and/or configured for compression and/or SSL. Various database protocols may support compression and/or SSL. For properties that do not support compression and/or SSL, the appliance may be configured to provide graceful degradation. In some embodiments, one or more properties may be used to identify a connection for directing a query to an appropriate database or database server. The intermediary may determine, based on the one or more properties, a connection, database and/or database server that is available and/or suitable for handling the query. For example, a particular existing connection may be able to support SSL or compression associated with one or more identified properties.

Properties may be defined and/or configured for transactions. One aspect of a database connection is the presence of a transaction. Transactions can ensure that multiple SQL queries are treated as a single atomic query. If a connection to the database occurs in the middle of a transaction, queries from another client-side connection may be unable to multiplex onto the transaction and/or connection. Transactions may be started by using the query "BEGIN" and terminated by using the query "COMMIT". In MYSQL, a connection can be made transactional during handshake by unsetting the autocommit bit, or by issuing the query "SET AUTOCOMMIT=0". The appliance may support any version of MYSQL, including but not limited to, for example, version 4.1.

In some embodiments, the appliance may process or handle MYSQL packets. Every mysql packet may include a 4-byte header. This header may contain the size of the trailing body. The appliance may use this data structure to parse, extract and interpret the 4-byte header, e.g., to determine a packet type. The appliance can then parse the body of a MYSQL packet based on the packet type.

The appliance may determine the type and/or characteristic of a MYSQL transaction. For example, the appliance may determine the value of the connection level AUTOCOMMIT parameter or the presence of BEGIN:COMMIT queries. The AUTOCOMMIT parameter may be set during the initial handshake. This parameter can also be set after connection establishment, e.g., using the query SET AUTO- COMMIT. In some embodiments, the appliance is configured to parse every query to determine the beginning and end of a transaction. The appliance may be configured, e.g., by a nsapimgr knob or control, to be transaction aware or not. The appliance may be configured by another knob or control, on whether to apply explicit parsing. This control may an option to avoid the processing overhead for parsing of every query.

In MYSQL protocol, a response may include flags to indicate whether a connection is in a transaction or not. If the connection is a transaction, the TRANSACTION flag is generally set. If the Autocommit mode is OFF, then the AUTOCOMMIT flag is not set. The appliance may parse the response for one or more of these flags. If the TRANSACTION flag is set or AUTOCOMMIT flag is not set, the appliance may not activate connection multiplexing. In some embodiments, connection multiplexing is activated by default if the above condition is not met.

A Mysql database server may support a plurality of character sets. The appliance may support a different number of character sets from that of the database server. The appliance may be configured to support a matching dataset with respect to the server during connection establishment. In some embodiments, the appliance may be configured or reconfigured to support a particular character set at any time by sending and/or processing a query. In some embodiments, a character set is associated with a connection. The appliance may process requests on connections such that a request with one character set is not multiplexed onto a connection with a different character set.

The appliance may be built and/or configured to parse queries sent by the client and results sent by the server. The appliance may make portions of each request and/or response available to an administrator through policy expressions (e.g., Policy Infrastructure, PI expressions). In some embodiments, the appliance is built and/or configured to support most or at least some character sets. The appliance may support some of the more commonly used data sets, e.g., UTF-18, ASCII and LATIN-x series. The character set associated with a connection can change after the initial handshake. This may be implemented by the appliance using one or more queries, such as:

SET NAMES <charset>COLLATION <collation>
SET CHARACTER SET <charset>

In some embodiments, the appliance includes an algorithm for character set handling. Character set handling may involve a first or initial character set which is identified during authentication. This character set may be used to parse messages, e.g., the uname/db sent in the message. This character set may be used to parse messages, e.g., the uname/db sent in the message. The server may assume that received queries are expressed using this character set. After authentication, the client can change the character set using one of a plurality of ways, for example, using the following commands or queries transmitted to the appliance:

SET NAMES 'C2'—The appliance may parse a query, extract the value of C2 and then associate it with the corresponding connection. The appliance may identify if a client connection is associated with a "SET NAME", and issue the same command on the server.
SET CHARACTER SET 'C2'—The appliance may handle this in a similar way to "SET NAMES".
SET @@character_set_client='utf8'

If two or more queries are received on the same connection, e.g., SET NAMES and SET CHARACTER SET, the appliance may handle the potential conflict. By way of illustration and in one embodiment, a client may create a TCP connection to the appliance. The appliance may send a server hello message with a first character set (e.g., to vsvr→charset, with default value: LATIN1). The client may send an authentication packet (e.g., AuthPkt) with charset C1. If, for example, the appliance determines that C1 is not an ASCII compatible encoding like LATIN1/2/5/7 and C1 is not UTF8 (only supported types), the appliance may return an ERROR message. The appliance may set its supported character set to C1 (e.g., CPCB→udb→cset=C1). The appliance may then parse for parameters and/or properties (such as uname/db) using C1. The appliance may further handle certain queries that modify the state of the connection (such as SET/PREPARE) so that these do not break request switching.

In some embodiments, responsive to receiving the latter queries, the appliance may respond back to the client with an OK response, but store the request onto the connection for separate or special processing.

By way of illustration, and not intended to be limiting in any way, the following pseudo code is one embodiment of a method for handling some of the above situations:

```
if request from client is a Query
    the query may be parsed using CPCB->udb->n_cset
    if command == "SET"
        if query == "SET NAMES 'C2'" && C2 is supported
            CPCB->udb->n_cset = C2
            Cpcb->udb->query_list << query
            Respond with OK
        else if query == "SET CHARACTER SET 'C2'" && C2 is
        supported
            CPCB->udb->n_cset = C2
            Cpcb->udb->query_list << query
            Respond with OK
        else if query is valid
            cpcb->udb->query_list << query
            Respond with OK
        else
            move to ABORT_CONN_TRACK
        end
    else if command == "PREPARE" || "USE"
        cpcb->udb->query_list << query
        Respond with OK
    end
end
...
Content Switch/Load Balance
...
Find Server connection(SPCB) with same UDB as the client
if no SPCB found
    send AuthPkt on a new SPCB
    for each stored_query in UDB->query_list
        response = Send stored_query on SPCB
        if response is ERROR
            Close SPCB
        end
    end
    response = forward query to server
    return response to client
else
    response = forward query to server
    return response to client
end
```

In the above, UDB may represent a data structure that stores client properties such as username, database, charset, etc. When a connection is created to the backend server, a connection with the same UDB may be picked up from a connection re-use pool. A query list may also be checked when matching to a UDB. While parsing the query, CSET may be used as a default character set. The initial CSET may be set in the authentication packet. Following authentication, the appliance may change the value of CSET when commands like SET NAMES or SET CHARSET are received. In some embodiments, the appliance may store a plurality of queries for each connection. Beyond a predetermined number of queries, the appliance may trigger a special mode for handling, e.g., Abort Conn Tracking Mode.

In some embodiments, the appliance may handle some SQL commands in a modified or different manner, e.g., SET, USE <db>, INIT_DB, PREPARE and COM_PREPARE commands. SET SQL queries may be used to define variables and/or properties which are associated with the connection. SET commands may be used to define global variables too. The appliance may apply a "WTM off" mode, e.g., to differentiate between global and local variable, or to handle conflicts. An user can change a database associated with a connection using the INIT_DB command or the USE query. In these cases, the appliance can parse the database value sent. Based on the determined database, the appliance can either (1) send a request to a corresponding server, (2) wait for an OK message and then set the database associated with the connection to the determined database, or (3) generate the OK message itself. If the appliance is in the middle of a transaction, the appliance may in some embodiments send the query directly to the server. The above behavior may be controlled via an API knob. The PREPARE or COM_PREPARE queries or commands may be used to create prepared statements associated with a connection. For the PREPARE or COM_PREPARE queries, the appliance may operate in a WTM off mode.

In some embodiments, the appliance may support connection multiplexing. The appliance may track the beginning and end of each SQL request and response, e.g., similar to that in HTTP requests and responses. The appliance may track this by accumulating and/or parsing incoming request data until the appliance determines the server for sending the request to. In some embodiments, at least the request header is accumulated in this process. Once the server is selected or identified, the appliance may identify or select a back-end connection from the server-side pool. The appliance may link the back-end connection to the client connection. The server-side connection may be selected based on corresponding or matching properties or parameters (e.g., user/db/capabilities). In situations where there is lack of a matching connection, a new back-end connection may be established. In some embodiments, the new connection is established if the appliance is in authentication mode.

In some embodiments, the appliance forwards the request to the identified server. The appliance may forward the response from the server to the client. When the complete request/response has been transmitted, the appliance may process the connections (e.g., client and/or server side connections) for reuse (e.g., using an init(Client/Server)ForReuse process). The appliance may delink or decouple the client-server connections. The delinked or decoupled connections may be placed in queues (e.g., serverinfor queues). These connections may be further segregated based on parameters such as user, db, capabilities, etc.

The appliance may provide authentication services to database protocol connections. The appliance may operate in a Transparent Mode. In the transparent mode, the appliance may create a connection between the client and the server that is end-to-end. In this case, when a client connects to the appliance, a connection to the server is created concurrently. The appliance may serve as a bridge for the authentication process, while the authentication occurs on the server. When the authentication is complete, the appliance can decouple the two connections and place them in the reuse pool. In some embodiments, a user may not need to configure any credentials on the appliance, possibly reducing friction involved in deployment. Monitors may be limited to TCP/SNMP-based monitors in the absence of available credentials.

In some embodiments, the appliance may operate in Authentication Mode (e.g., instead of Transparent Mode). An administrator may configure database users on the appliance as SQL users. The appliance may authenticate the client side connection. The appliance may provide credentials for server-side connections. In this mode, the appliance may define or add SQL user as a new type of user, e.g., to distinguish from AAA-type user. This may avoid the situation where a user tries to login via AAA/VPN using the credentials of a database user (i.e., SQL user) and vice versa.

In some embodiments, the appliance may provide load balancing features. Some of these features may be adapted from pre-existing features described above. By way of illustration, load balancing in the Transparent Mode may involve selection of a server with a matching server-side connection that is available. The appliance may select from one of a plurality of servers providing access to a requested content, file or type of data. The appliance may select from one of a plurality of servers that is consistent with, or supports the properties identified based on the received query. The appliance may select from one of a plurality of connections that is consistent with, or supports the properties (e.g., character set) identified based on the received query. The appliance may select one of the plurality of servers and/or connections for handling the query based on application of a policy on one or more properties identified. In certain embodiments, the appliance may select one of a plurality of servers and/or connection that supports a transaction type identified based on one or more received queries.

The appliance may select one of the plurality of servers and/or connections that is presently not handling any queries, or handling fewer queries than another server and/or connection. By way of illustration, the appliance may determine that one or more queries have been buffered/stored for a first connection or database server, and may select another connection or database server for handling a new query. The appliance may reconfigure a selected connection based on the query and/or one or more properties identified. In some embodiments, the appliance may establish a new connection for sending the query to the selected database server.

In some embodiments, the appliance may provide content switching features. The appliance may provide one or more database-related content switching policies adapted from available content switching policies. The content switching policies may use various rules or conditions to select a server, e.g., via connection characteristic, command parameters, properties or information based on an SQL query. These types of information may be parsed, tested or exposed using policy expressions.

The appliance may be configured to support various policy expressions for supporting database queries and transactions. Various types of information or properties may be exposed through policy or PI expressions, e.g., via a policy engine of the appliance. The policy expressions may include one or more features of policy expressions described above in connection with FIGS. 7A through 7C. Policy expressions configured for HTTP or other protocols may be adapted for SQL.

One classification of properties or information that an appliance may expose through policy expressions is connection characteristics. Connection characteristics may include data associated with a database connection. Since each of the connection characteristic data point may be dependent on the respective database protocol, each data point may be name-spaced in connection with the respective protocol. Examples of policy expressions for connection characteristics include:

MYSQL.USER—String of the authenticated user
MYSQL.DATABASE—String of the database associated with the connection
MYSQL.CAPABILITIES—An indicator of client capabilities established during handshake
MYSQL.CHARSET—The Character Set sent by the client Another classification of properties or information that an appliance may expose through policy expressions is command parameters. Command parameters may include characteristics of the actual request. Command parameters may be protocol specific and hence may incorporate protocol specific namespacing. Examples of policy expressions for command parameters may include:

MYSQL.REQ.SIZE—Size of the request
MYSQL.REQ.COMMAND—The type of command
MYSQL.REQ.SIZE—Integer representing the size of the request. This is similar to CONTENT_LENGTH property of HTTP.
MYSQL.REQ.COMMAND—Enum for the type of request command. The different values of the ENUM may be QUERY, INIT_DB, etc.

Yet another classification of properties or information that an appliance may expose through policy expressions is based on SQL Query Information. Data manipulation on a database may be carried out using SQL queries. The grammar for these queries are mostly standard for databases. In some embodiments, there are different approaches for exposing SQL queries to the user through policies. One approach may be to expose the entire query string to the user and allow the user to make decisions using existing string manipulation functions. Another approach may involve parsing the query and exposing parts of the query using policy expressions. One non-limiting example of a SQL query is:

| SELECT | COL1,COL2 | FROM TABLE 1 | WHERE CONDITION1; |
|---|---|---|---|
| (command) | (selectpart) | (frompart) | (wherepart) |

Each section of the SQL query may have an associated name. These names may be used in or identified using policy expressions. Examples of policy expressions based on SQL query information include:

MYSQL.REQ.SIZE—Size of the request
MYSQL.REQ.QUERY.SELECTPART
MYSQL.REQ.QUERY.INSERTPART
MYSQL.REQ.QUERY.FROMPART
MYSQL.REQ.QUERY.TEXT—String covering the entire query.
MYSQL.REQ.QUERY.TEXT(n)—String covering the first n bytes of query.
Like HTTP.BODY(n)
MYSQL.REQ.QUERY.COMMAND—String for the first keyword of the query.

Another classification of properties or information that an appliance may expose through policy expressions is Response Parameters. Response parameters, such as server status and error numbers, may be exposed through expressions. Expressions for rows and field set can also be exposed. To expose the individual column, the appliance can be configured to use terminology similar to JDBC, where the datatype of the column may be known to the user. If the datatype of the column sent by a server is different from that of the expression, an undefined return value (e.g., UNDEF) may be raised. NULL columns may be checked using an IS_NULL( ) expression, for example. Examples of policy expressions based on response parameters include:

MYSQL.RESP.ERROR
MYSQL.RESP.STATUS
MYSQL.RES.ROW(i).TEXT_T_ELEM(j)
MYSQL.RES.ROW(i).NUM_AT_ELEM(j)
MYSQL.RES.ROW(i).BOOL_AT_ELEM(j)
MYSQL.RES.ROW(i).DOUBLE_AT_ELEM(j)
MYSQL.RES.ROW(i).IS_NULL(j)
MYSQL.RES.TYPE—Enum for the response type. Its values can be MYSQL_RES_ERROR, MYSQL_RES_OK, MYSQL_RES_RESULT_SET
MYSQL.RES.ERROR.NUM—This may include the error number field of the error response. If this expression is called when the response type is not error, then an UNDEF may be raised. Using ERROR as a namespace to indicate ERROR response type.
MYSQL.RES.ERROR.SQLSTATE—String for the sqlstate field of the error response.
MYSQL.RES.ERROR.MESSAGE—String for the message field of the error response.
MYSQL.RES.OK.AFFECTED_ROWS—Long integer for the affected_rows field of OK packet
MYSQL.RES.OK.INSERT_ID—Long integer for the insert_id field of OK packet
MYSQL.RES.OK.STATUS—Integer for the status field of OK packet
MYSQL.RES.OK.WARNING_COUNT—Integer for the warning count field of OK packet
MYSQL.RES.OK.MESSAGE—String for the message field of the OK packet.
MYSQL.RES.RESULT_SET.STATUS—Integer for the status field of result set response
MYSQL.RES.RESULT_SET.WARNING_COUNT—Integer for the warning count field of result set response
MYSQL.RES.FIELDS_COUNT—Long Int for the number of columns in the response
MYSQL.RES.FIELDS[index].CATALOG—String, property of the index'th field
MYSQL.RES.FIELDS[index].DB—String, property of the index'th field
MYSQL.RES.FIELDS[index].TABLE—String, property of the index'th field
MYSQL.RES.FIELDS[index].ORGIGINAL_TABLE—String, property of the index'th field
MYSQL.RES.FIELDS[index].NAME—String, property of the index'th field
MYSQL.RES.FIELDS[index].ORGINAL_NAME—String, property of the index'th field
MYSQL.RES.FIELDS[index].CHAR_SET—String, property of the index'th field
MYSQL.RES.FIELDS[index].DATATYPE—String, property of the index'th field
MYSQL.RES.FIELDS[index].FLAGS—Integer property of the index'th field
MYSQL.RES.FIELDS[index].LENGTH—Integer property of the index'th field
MYSQL.RES.FIELDS[index].DECIMALS—Integer property of the index'th field
MYSQL.RES.ROWS_COUNT—Long Integer for the number of Rows in the response
MYSQL.RES.ROW[i].NUM_AT_ELEM[j]—The j'th column of the I'th row returned as an integer MYSQL.RES.ROW[i].TEXT_T_ELEM[j]—The j'th column of the I'th row returned as a string MYSQL.RES.ROW[i].BOOL_AT_ELEM[j]—The j'th column of the I'th row returned as a boolean MYSQL.RES.ROW[i].DOUBLE_AT_ELEM[j]—The j'th column of the I'th row returned as a double MYSQL.RES.ROW[i].IS_NULL_ELEM[j]—If the j'th column of the I'th row is NULL or not, returned as a boolean In view of the policy expressions described above, an appliance can be configured to provide various database proxy services. For example, policy expressions configured for HTTP or other protocols may be adapted for SQL. The appliance may provide and manage content switching and/or load balancing between connections, databases and/or database servers by applying policy expressions to parse database communications received by the appliance. Via policy expressions, for example, a policy of the appliance may provide user persistence by directing database queries from the same user to a single database connection. An appliance may manage switching between databases by applying one or more policies on a query to identify related information managed via multiple databases and/or database servers. An appliance may also provide health monitoring with respect to database queries of a particular user by using policies to identify the databases, connections and/or database servers that a user uses within a session.

In some embodiments, the appliance may identify that a SQL query is made across multiple packets. The appliance may parse any portion of a query, which may include one or more packets, only to the extent identified by a policy or needed for a particular operation. For example, the appliance may identify a database servers by parsing a first keyword of the query (e.g., in a first packet of the query) via policy expressions. The appliance may associate the database server with the query without inspecting the other packets of the query, thereby providing server persistence. This decision-making based on inspecting a first packet of a query may also reduce processing latency. In doing so, the appliance may be able to improve efficiency and performance in processing database queries. In some embodiments, the appliance uses query hashes to provide persistency to the server, e.g., similar to the mechanism employed in HTTP URL Hash Persistence. The appliance may parse a SQL hash and reduce server load by sending the same query to the same server.

In some embodiments, the appliance may provide a centralized log for database operations and/or communications. The appliance may perform logging (e.g., database audit logging) based on policies. For example, policy expressions may identify a database protocol, user, or other information for logging particular query or set of queries. Similarly, the appliance may perform tailored health monitoring using policies and policy expressions.

Although much of SQL is standard, each database implementation may include many proprietary elements. To support various database implementations, the appliance may provide different policy expressions for each implementation. By way of illustration, at least some of the policy expressions described above are MYSQL policy expressions. Some of these policy expressions may be used with or adapted for other databases.

In some embodiments, the appliance supports nested queries. A SQL query can contain nested SQL queries, for example:

SELECT t1.* from (select * from t2) as t1;

where the portion in parenthesis is a nested query. One method would be expose this as a string. Another method is to support a construct (e.g., "TYPE_CAST_TO_SQL_QUERY") which can treat a string as a SQL query and then allow any part of it to be accessible to the user through the earlier mentioned policy expression.

In some embodiments, the appliance supports multiple queries in single command. Such a single command packet can contain multiple SQL queries which are separated by a separator (e.g., ";"). The appliance can provide a control or knob to a user, to indicate to the appliance whether to parse each query to determine the presence of multiple queries.

In some embodiments, a substantial portion of requests to a database are SQL queries. The appliance may parse these queries for tracking transactions. If a policy has been configured which references a part of the query, the appliance will parse the query. In some embodiments, the appliance may parse only the portion of a query being referenced in a policy. Various sections of the query may be determined based on the presence of certain keywords like FROM, WHERE, INTO, etc. For example if a FROMPART of a query is needed, then the part of the query extending to the end of FROMPART may be parsed. In some embodiments, this parsing is performed in a streaming manner, e.g., for efficiency reasons. The state of the parser may be stored in a parameter, SqlInfo, which is similar to Httpinfo for the HTTP protocol.

In some embodiments, the appliance can monitor the health of various database servers using one or more types of monitors. The appliance may use a TCP Monitor. This form of monitoring indicates if the database server is up or not. In some embodiments, most if not all services (e.g., including database-related services) may be monitored using a TCP monitor. In some embodiments, the appliance may use a SNMP Monitor. Database servers may expose information through SNMP. In some embodiments, a user may be able to determine the status of a server based on SNMP. In certain embodiments, an appliance may use a SQL Query Monitor. The status of database servers can be determined by first sending custom SQL queries and then inspecting the response. Such monitors can be configured on an appliance by using user-space monitors. The appliance may be configured with adequate libraries for a user to include such monitors. In cases where user space monitors are already be present, the appliance may also provide native monitors. These monitors may receive information about an SQL user, a query and/or a PIRL expression, and inspect the response to determine server status. For SQL query monitors, the appliance may provide policy expressions to read the response. By way of illustration, one embodiment of a command for adding a SQL monitor is as follows:

add lb monitor mysql_mon MYSQL -sql_user my_user -sql_db my_db -sql_charset utf8 - sql_query "SELECT * FROM table1" -up_condition "MYSQL.RES.ROWS[0].COLUMN[0] == 1"

In certain embodiments, since database protocols differ between one another, an appliance may distinguish a corresponding service from each database protocol to be of a different service type. In some embodiments, various services of an appliance may be configured as follows:

add lb vserver lb1 MYSQL|SQLSVR|ORACLE ... -authentication ON|OFF
add cs vserver cs1 MYSQL|SQLSVR|ORACLE ... -authentication ON|OFF
add service svc1 MYSQL ...

-continued

```
bind lb vserver lb1 svc1
add cs policy cspol1 -rule "SQL.COMMAND == \"SELECT\""
bind cs vserver cs1 lb1 -policy cspol1 -priority 10
add sql user user1 -password pass1
```

In some embodiments, by way of illustration, the appliance handles and/or facilitates handshake and/or authentication between a client (e.g., a client or server device) and a server (e.g., database server) as follows. In certain embodiments, the appliance may act as a "client" in communication with a database server. The appliance may also operate (e.g., issue or modify requests) on behalf of a client accessing a database of a database server.

Figure 7B:
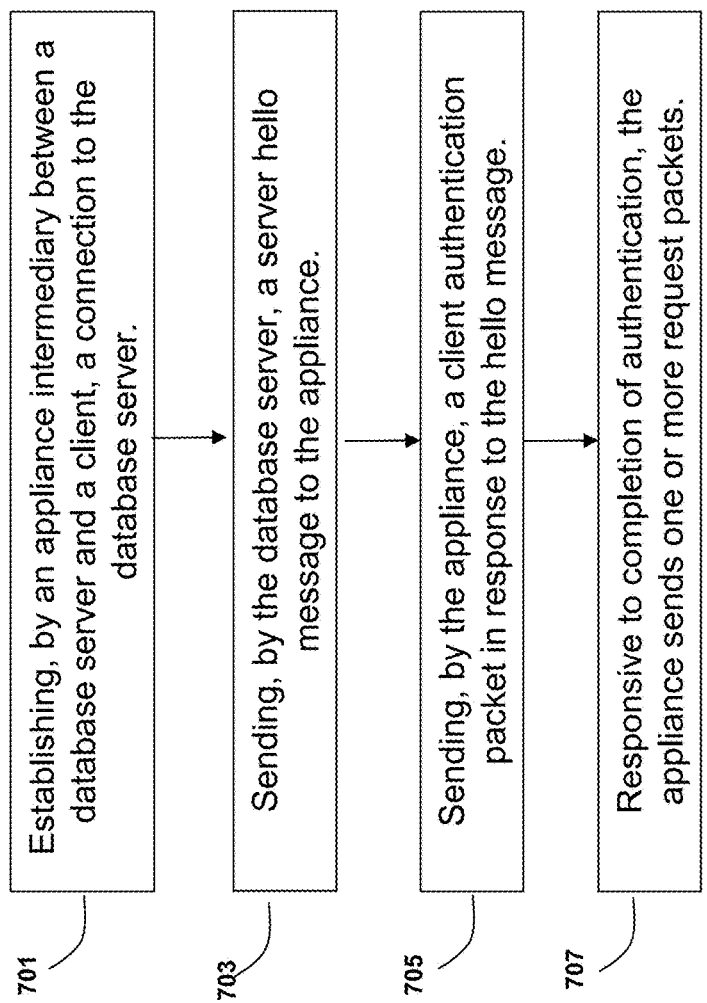
FIG. 7B is a block diagram of one embodiment of a method a system for providing database proxy services.

Referring to FIG. 7B, one embodiment of a method for providing database proxy services is depicted. In brief overview, the method includes the step of establishing, by an appliance intermediary between a database server and a client, a connection to a database server (701). The database server sends a server hello packet to the appliance (703). The appliance may send a client authentication packet in response to a hello packet. The server may generate a response (705). Responsive to completion of authentication, the appliance may send one or more request packets (707).

In further details of 701, an appliance intermediary between a database server and a client establishes a connection to the database server. In some embodiments, when the appliance initiates or establishes a connection to the database server, the server may perform handshaking and/or authentication with the appliance. The server (e.g., database server) may send a hello packet (703). In some embodiments, the database server sends a hello packet with one or more of the following details:

protocol version: a string value.

svr version: A string value.

capabilities: This may indicate whether the server supports SSL, Compression, v4.1 protocol, etc. Certain capabilities may be handled with an explicit action.

language: This may identify the current server character of the server. In some embodiments, the language is matched between the client and server connections.

status: This may include additional information, e.g., whether the server is in autocommit or transaction mode. Other status flags may be configured or utilized.

scramble: This may include a random key. This may identify or involve a client password, e.g., a SHA1 hashed with the random key. If there is a change of user, the same scramble may be used.

In some embodiments of 705, the appliance may send a client authentication packet in response to the hello packet. The client or appliance may send a client authentication packet in response to the hello packet. The client authentication packet may include the following parameters or information:

user: This may indicate an user to authenticate the connection with. In some embodiments, this is not a compulsory field as the information can be specified using a client command.

scrambled password: This may include a password which has been SHA1 hashed. The server may authenticate the user using this password.

database: This may indicate a database upon which subsequent queries operate on.

capabilities: This may include one or more bits indicating the capabilities that the server passed as available. The client may leave some of the bits (i.e., capabilities) on, add others, and pass the selected capabilities back to the server. For example, a flag may indicate whether compression is supported or desired. Another flag (e.g., CLIENT_CONNECT_WITH_DB) may indicate the presence of an optional databasename.

charset_number: In some embodiments, this may be similar to the server language parameter described above. This may be used to identify cases where the client is not synchronized with the language sent by the server.

max_packet_size: This may indicate the maximum number of bytes in a packet for the client. This may be viewed as analogous to the MSS feature in TCP.

The client and server connections may be checked or configured to have the same value for this parameter.

In certain embodiments, the server may generate a response. In some embodiments, the server may generate and send a response to the appliance. This response may be an OK packet or an Error packet. In some embodiments, the response includes a result packet. The response packet can be of one or a plurality of types. The type of response may be determined by the first byte of the packet, for example.

In some embodiments, the server may generate an OK response. This type of response may indicate that the operation was successful. In case of write commands, the command may also include the number of rows affected (e.g., the number of database rows written to). This response may include a server status field. If the response is an Error packet, the connection may be closed or terminated, e.g., by the client, server and/or appliance 200.

In some embodiments, the server may generate an ERROR response. This message may be returned in case of a failure. The message may include an error code field that the appliance can interpret to identify the type and/or source of the failure, any other information related to the failure, and/or actions to take in view of the failure. The OK packet may, in some embodiments indicate completion of authentication for the requesting client or user.

In some embodiments, the server may generate a response including a result set. The result set may be generated responsive to a command from the client. The result set may comprise multiple packets which may be sent in the following order: (1) Result Set Header Packet: the number of columns, (2) Field Packets: column descriptors, (3) EOF Packet: end of Field Packets, (4) Row Data Packets: row contents, and (5) EOF Packet: end of Data Packets. The appliance may monitor the state of the packets in the result set. The second EOF may indicate the completion of the response.

The appliance may parse and/or process the received packets to interpret or identify the type of each packet. In case of packets related to monitors, data included in the packets may be parsed and/or interpreted, e.g., to obtain the health and/or status of a database. In some embodiments, the appliance is able to first ascertain a need to parse a packet (e.g., based on identification of the packet) before parsing the packet. Some of these embodiments are similar to how the appliance performs HTTP body parsing.

In further details of 707, responsive to completion of authentication, the appliance may send one or more request packets. In some embodiments, the appliance or client may send one or more request packets. A request packet may be referred to as a command packet in some embodiments. Each request packet may be one of a plurality of types of request. The first byte of this packet may indicate or define the type of the request. By way of illustration and not intended to be limiting, some of the various types of requests or commands may include:

COM_CHANGE_USER: this command may be used to change the user associated with the connection COM_INIT_DB: this command may be used to change the database COM_FIELD_LIST: this command be used to list fields associated with connection COM_QUERY: the command may be used to represent or include a SQL query. The SQL query may be transmitted as a text string following the command byte of the request.

Referring to FIG. 7C, one embodiment of a method for selecting by an intermediary device a database from a plurality of databases to forward a structured query language (SQL) query request based on a property of the SQL request is depicted. In brief overview, the method includes the step of establishing, by a device intermediary to a plurality of clients and a plurality of databases, a plurality of connections to the plurality of databases (751). The device may receive, from a client of the plurality of clients, a request to execute a structured query language (SQL) query (753). The device may evaluate, responsive to a policy, one or more properties of the request to execute the SQL query (755). The device may select a database from the plurality of databases based on a result of evaluation of the one or more properties of the request to execute the SQL query (757). The device may forward the request to execute the SQL query to the selected database via a connection of the plurality of connections (759).

In further details of 751, a device intermediary to a plurality of clients and a plurality of databases may establish a plurality of connections to the plurality of databases or database servers (generally "databases"). In some embodiments, the device establishes a connection to a database responsive to receiving a query in connection with the database. For example, the device may determine that the query is addressed/directed to the database, or can be appropriately processed by the database. In certain embodiments, the device establishes a connection to a database, operating as a proxy of the database. The device may establish a plurality of connections to a plurality of databases to operate as a switch (e.g., access or content switch) between the databases. The device may establish a connection to a database to provide, facilitate, protect, control and/or manage access to the database. In some embodiments, (751) may incorporate any of the steps or features discussed above in connection with (701) of FIG. 7B.

In various embodiments, the device may establish a connection to each database server. In some embodiments, the device may establish a connection to each database residing in, or accessed via one or more database servers. Some database servers or databases may support certain character sets. The appliance may be configured to support a number of character sets, some of which may match, or is compatible with, that of certain database servers. In some embodiments, the appliance may be configured to support a matching dataset with respect to a respective database server during connection establishment.

The device may establish a pool of connections to each database of the plurality of databases. The pool of connections may include connections supporting different properties and/or variants of SQL protocol. The pool of connections may include active connections (e.g., actively handling communications) and inactive connections. The pool of connections may include some connections that are available for reuse from a previous communication session (e.g., database query or transaction). In some embodiments, the device may transmit different queries to the same database over different connections to the database. The device may multiplex, distribute or redirect SQL requests/queries from a plurality of clients, via the pool of connections, to one or more databases of the plurality of databases.

Referring now to (753), the device may receive, from a client of the plurality of clients, a request to execute a structured query language (SQL) query. The device may receive the SQL query as a proxy for a database server. In some embodiments, the device intercepts all or some queries or requests transmitted from a client. For example, the device may be configured to intercept SQL queries or requests from a client. The device may proxy and/or process the SQL queries or requests. In some embodiments, the device performs load balancing across connections, databases and/or database servers responsive to receiving a plurality of queries or requests from one or more clients.

The device may receive the SQL query or request in any type or form of communication packet, frame or message. The device may parse and/or process received packets to interpret or identify the type of each packet. For example, the device may determine that a message includes a query in MYSQL or any other type of database protocol. The device may recognize or determine that the message or request includes a SQL query or request, for example, by parsing some portion of the message or request (e.g., header information). The device may engage in an initial handshake with the client for exchanging capabilities and/or compatibilities in a client-server relationship. The handshake may include authentication of the client. In some embodiments, the device determines that a message or request is a SQL message based on the handshaking process. The device may determine that a message or request may include a SQL message based on an identification of the destination (e.g., destination address is an IP address of a database server) and/or connection (e.g., a connection ID of a connection that supports properties of a SQL query).

In some embodiments, a SQL firewall of the device may perform checking and protection of database communications traversing the device, such as checking SQL queries and responses. The SQL firewall may allow, deny, return, filter or redirect a database query from a client, e.g., by applying one or more firewall policies. In some embodiments, the device may authenticate a user and/or client side connection to the device. The device may provide an audit point and/or authentication for funneling requests, e.g., from one or more client side connections to different server-side connections. The device may recognize or support a SQL user as a new type of user, e.g., to distinguish from a typical AAA-type user. The device may authenticate a SQL user using SQL or database-specific policies prior to assigning a server-side connection to transmit a query of the user. The device may apply SQL or database-specific policies in response to receiving a query from a SQL user.

In further details of (755), the device may evaluate, responsive to a policy, one or more properties of the request to execute the SQL query. The device may parse queries sent by one or more clients. The device may expose and/or make portions of each request and/or response available to an administrator through policy expressions. The device may determine a type, property and/or characteristic of a SQL transaction or query. The device can then parse the body of a SQL packet based on the packet type. The device may parse a query to identify a character set of the query (e.g., extract the value of C2, to associate with a corresponding connection for example). In certain embodiments, the appliance processes multiple queries in single command or packet. In some embodiments, the device can parse and/or evaluate nested SQL queries, and may evaluate the queries according to the nested sequence.

In some embodiments, the device manages switching and/or load balancing between databases based on application of one or more policies and policy expressions on a database request or query. The device may identify or determine one or more properties related to the client, query and/or database, for example, based on information extracted from the query and/or the type of the query. One or more properties may be used by the device to identify a connection for directing a query to an appropriate database or database server. For example and in some embodiments, a character set identified based on a SQL query may be associated with a connection. The device may determine, based on the one or more properties, a connection, database and/or database server that is available and/or suitable handling the query. For example, the device may determine, via application of a policy or otherwise, that a particular existing connection is able to support SSL or data compression associated with one or more identified properties.

In certain embodiments, to support various database implementations, the appliance may provide different policy expressions for each implementation. The appliance may create, store, maintain, manage, select and/or enforce policies for processing a database query. The appliance may maintain and/or select particular policies directed to certain types of SQL queries and/or properties associated with received SQL queries. Responsive to a policy, the device may evaluate one or more properties of the request to process or redirect the SQL query. In some embodiments, the policy may specify an expression (e.g., policy expression) to evaluate the one or more properties. The one or more properties, may include a characteristic of a database connection for the request to execute the SQL query. The one or more properties or characteristics may, for example, include one or more of the following: identification of an authenticated user, a name of the database, a character set sent by the client and client's capabilities. Other embodiments of properties that can be evaluated are described above in connection with FIG. 7A.

The one or more properties or characteristics may, in certain embodiments, include one or more command parameters of the request for the SQL query. A command parameter may include one or more of the following: a size of the request and a type of command. Some embodiments of command parameters are described above in connection with FIG. 7A. In some embodiments, the policy may specify an expression to evaluate the one or more properties of the request to execute the SQL query, comprising a grammar part and a data part of the SQL query. Embodiments of these properties are described above in connection with FIG. 7A.

Referring now to (757), the device may select a database from the plurality of databases based on a result of evaluation of the one or more properties of the request to execute the SQL query. The device may select a database that matches or is compatible with the capabilities of the client and/or SQL transaction. For example, the device may select a database that supports a character set indicated by the request or query. The device may select a database based on availability of data or content requested by the client. In some embodiments, the device may select a database from the plurality of databases based on any one or more of the following: an address or identifier of the database in the request, the level of access provided to the authenticated user, the availability of a suitable connection to the database, the proximity and/or availability of the corresponding database server, and the load on the corresponding database server.

In some embodiments, a load balancer of the device selects the database from the plurality of databases. For example, the load balancer may select a database based on least connection load balancing (e.g., the number of active and inactive connections to the database, the total number of connections to the database), availability of the respective database server, available bandwidth on a connection to the database, the amount of SQL queries processed by the database server, the number of queries buffers or queued for the database or database server, and/or other properties determined based on the request. The device may select from one of a plurality of database servers providing access to a requested content, file or type of data. The device may select from one of a plurality of servers that is consistent with, or supports the properties identified based on the received query. The device may select from one of a plurality of connections that is consistent with, or supports the properties (e.g., character set) identified based on the received query.

The device may select one of the plurality of servers and/or connections for handling the query based on application of a load balancing or other policy on one or more properties identified. In certain embodiments, the device may select one of a plurality of servers and/or connection that supports a transaction type identified based on one or more received queries. The device may select one of the plurality of servers and/or connections that is presently not handling any queries, or handling fewer queries than another server and/or connection. By way of illustration, the device may determine that one or more queries have been buffered/stored for a first connection or database server, and may select another connection or database server for handling a new query.

In some embodiments, the device determines, responsive to the result of the evaluation, that the request to execute the SQL query comprises a write query. The device may select a database that includes a master database in a master and slave configuration. In some embodiments, the device determines, responsive to the result of the evaluation, that the request to execute the SQL query comprises a read query. The device may select a database that includes a slave database in a master and slave configuration. In certain embodiments, the device determines, responsive to the result of the evaluation, that the SQL query is directed to a database corresponding to one or more of: a current connection, a present SQL transaction, a predetermined user, a predetermined database name and a predetermined table.

In certain embodiments, by recognizing certain properties using policy expressions, the device may be able to support user persistence for database communications with respect to a database connection, database, database server, and/or processing core (e.g., of a multi-core system in the device for handling SQL communications). The device can use policy expressions to maintain transaction persistence for a group of SQL communications, with respect to a database, database server, database connection, etc.

In further details of (759), the device may forward the request to execute the SQL query to the selected database via a connection of the plurality of connections. In certain embodiments, the device selects a database that has a suitable connection to convey the request (e.g., secured with SSL). In some embodiments, the device selects a connection or establishes a connection to the database after selecting the database. In some of these embodiments, the device selects an available connection to the selected database, e.g., from a pool of established connections. The device may reconfigure an available connection to the selected database, e.g., based on the one or more properties identified. For example, the one or more properties may request SSL or local caching features to be supported. The device may select a connection that supports the requested features, or reconfigure a connection to support the requested features.

In some embodiments, the device may grant different permissions to different users (e.g., based on the identified properties). The device may assign a particular connection (e.g., supporting a certain level of access permissions) to an authenticated user to prevent multiplexing of requests between different users with different access permissions.

In certain embodiments, the device may select a connection based on a UDB of the client. The UDB may represent a data structure that stores client properties such as username, database, character set, etc. The device may select a connection that matches the UDB of the client from a pool of connections (e.g., a connection re-use pool), when making a server-side connection to the database. In some embodiments, the appliance may reconfigure a selected connection based on the query and/or one or more properties identified. In some other embodiments, the appliance may establish a new connection for sending the query to the selected database server.

In some embodiments, the device may store or buffer a plurality of queries for each connection. When the device determines that a predetermined number of queries has been accumulated or stored, the device may trigger a special mode for handling, e.g., Abort Conn Tracking Mode. In some embodiments, in response to the determination, the device may forward the queries in batch mode via the assigned connection.

By way of illustration of the methods described herein, the device may perform connection multiplexing between a plurality of databases. The device may track the beginning and end of each SQL request and response. The device may accumulate and/or parse incoming request data until the device determines the appropriate server for sending the request to. In some embodiments, the device accumulates the request header in this process. Once the server is selected or identified (e.g., via a policy determination based on properties identified in the request header), the device may identify or select a back-end connection from the server-side pool. The device may link the back-end connection to the client connection. The server-side connection may be selected based on corresponding or matching properties or parameters (e.g., user, client and/or database capabilities). In situations where a matching connection is not available, a new back-end connection may be established by the device.

H. Systems and Methods for SQL Caching

Figure 8A:
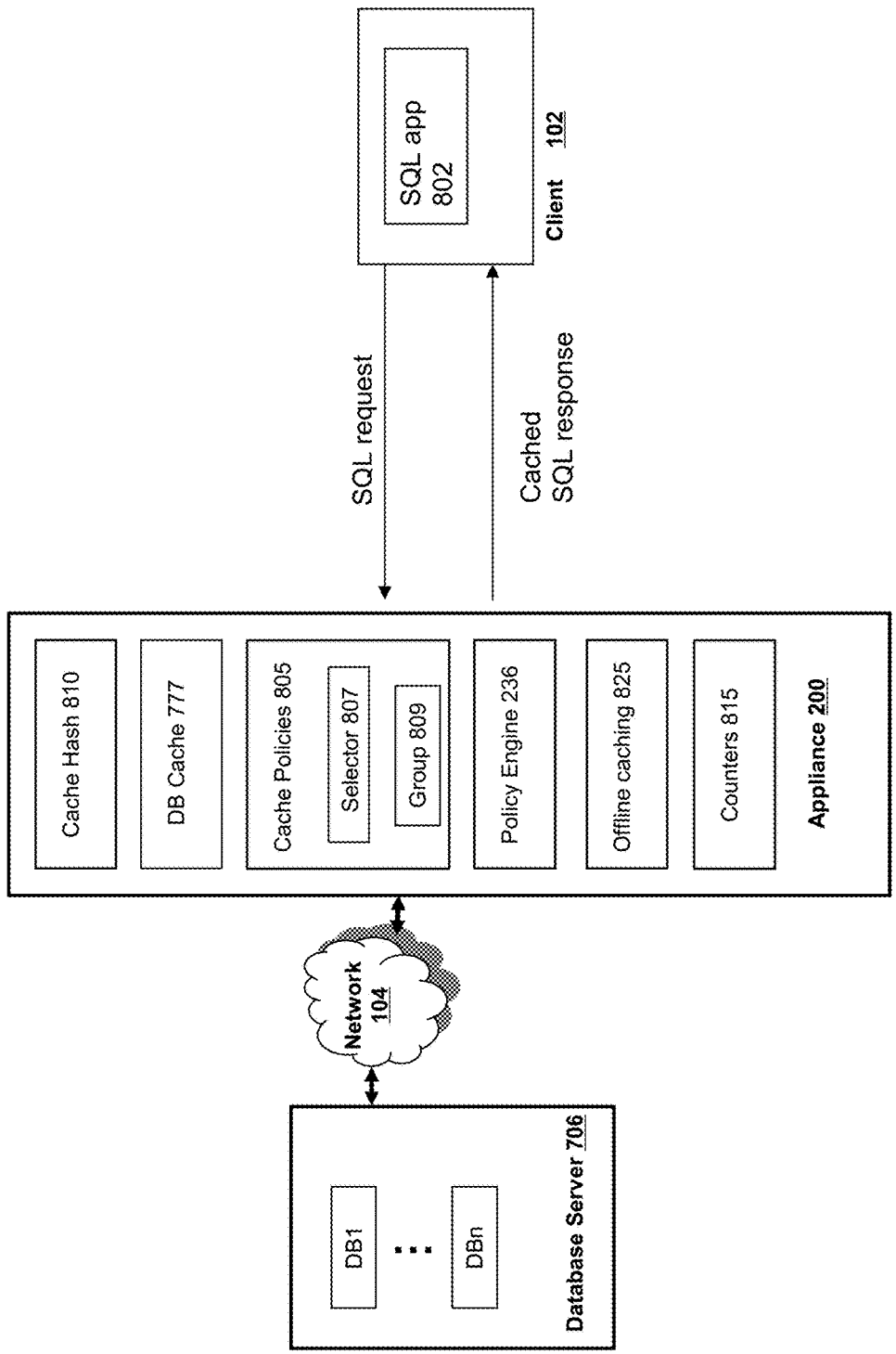
FIG. 8A is a block diagram of an embodiment of a system for SQL caching.

Referring now to FIG. 8A, a system for caching of SQL responses using integrated caching is depicted. An intermediary device of the system, such as an appliance, multi-core appliance and/or node of a cluster 600, may intercept a query sent from a client and send a response to the client if the response is stored in the integrated cache associated with the intermediary device (e.g., cache hit). When the requested content is not found in the integrated cache (e.g., cache miss or a non-storable response), the intermediary device can send the request to the origin server (e.g., database server 706). Cache misses can be storable or non-storable, where storable cache misses are stored in the cache when the origin serves the response, while a non-storable cache miss is not stored in the cache.

In brief overview of FIG. 8A, the appliance 200 may provide a plurality of services for facilitating and processing communications between database servers 706 and clients 102, including but not limited to cache hashing 810, database cache 777, cache policies 805, policy engine 236, offline caching 825, and counters 815. The appliance 200 may be intermediary to a client 102 executing an SQL application 802, and a database server 706 that includes one or more databases. The appliance 200 may communicate with database server 706 and/or the client 102 via network 104. In some embodiments, specialized networked services available to web servers and application servers may be adapted to support SQL requests from a plurality of clients 102. For example, the client 102 may submit an SQL request via an SQL application 802. In response to the SQL request, the appliance 200 may provide to the client 102 a cached SQL response. In some embodiments, one or more components of the appliance 200 can function as a database proxy configured to perform one or more functions disclosed herein.

In some embodiments, a plurality of clients 102 can execute or run any structured query language application or any application that is configured to generate an SQL query request. For example, SQL query requests may be submitted via a web browser, a mobile device executing a mobile application, a database application, etc. The SQL query may correspond to one or more SQL syntaxes or standards.

The intermediary device 200 may receive the SQL query request via a client 102. In some embodiments, the intermediary device 200 includes a policy engine 236 configured to identify that an SQL query request matches a rule of a policy for caching SQL responses from the database. The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. For example, the policy engine 236 may access cache policies 805 of the intermediary device 200. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200.

In an illustrative example, the intermediary device may include or be configured to function as a database proxy that receives an SQL response from the database server 706, such as in view of any embodiments described in connection with FIGS. 7A-7C. The SQL response may be responsive to an SQL query request of the client 102. Upon receiving, by the database proxy, the SQL response from the database server 706, the policy engine 236 may apply a policy to identify a match. For example, the policy engine 236 may identify that an expression of the rule of the policy matches SQL content of the first SQL query request. In some embodiments, the policy engine 236 may obtain a policy from a cache policies module 805.

In some embodiments, the policy engine 236 applies a cache policy 805 including a cache selector 807 to an SQL query request. In some embodiments, a cache selector 807 may act as a filter for particular objects in a content group 809. Cache selectors 807 may include patterns or expressions that are formed of a combination of various parts of a request from the client and/or a response. Expressions may include Policy Infrastructure ("PI") expressions such as username, database name, character set, and/or client version. If the policy engine 236 identifies a match, the policy engine 236 can perform the corresponding cache action indicated in the cache policy 805. For example, if the policy indicates that the response to the request should be and/or should have been stored in cache, the policy engine 236 can facilitate storing the response in cache and/or retrieving the response from cache and serving the response to the client 102.

In some embodiments, the appliance 200 includes one or more cache policies 805 that can be used to control the cache behavior by indicating cache actions to take on the SQL response, including what the appliance 200 stores in the cache memory associated with the appliance 200, when data should be stored in cache, cache expiration and/or cache invalidation. Cache policies 805 may include actions and expressions that enable the system to determine which requests and responses to cache. Cache policies 805 can be request-based policies and/or response-based policies. For example, a determination as to whether or not to store the response in cache can be based on information associated with the request and/or information associated with the response itself. In some embodiments, request and/or response-based policies can include the cache actions such as CACHE (e.g., transaction is cacheable; store the object), NOCACHE (e.g., transaction is non-cacheable), INVAL (e.g., mark the object as invalid). In some embodiments, request-based policy cache actions may further include MAY_NOCACHE (e.g., response may be cacheable, where the default if no response cacheability policy matches is to not cache the response) and MAY_CACHE (e.g., the response may be cacheable, where the default if no response cacheability policy matches is to cache the response). In some embodiments, the policy engine 236 may be configured to identify that a cache policy 807 specifies a selector 807 for identifying one or more content groups 809 to which the policy applies (e.g., a content group 809 corresponding to objects of a particular database of database server 706). The policy engine 236 may be further configured to perform the cache action of the policy on the group of content identified by the selector 807.

In some embodiments, a cache policy 805 may indicate that a client is no longer served from cache once a client starts a transaction where the client explicitly enters into a non-autocommit mode. A non-autocommit mode may refer to a mode in which the SQL application itself is responsible for issuing transaction initiation (implicitly or explicitly) and termination (commit or rollback) commands. In some embodiments, a cache policy 805 may indicate that responses pursuant to non-autocommit transactions are not stored in cache, while invalidation policies may still be evaluated. In some embodiments, a cache policy 805 may indicate that queries which modify the properties of the connection (e.g., SET and DECLARE) may not be cached. However, since the hash present in the user database entry may reflect the query, the client 102 may still be served from cache for further queries.

Cache policies 805 may also include policies for cache expiration where objects can be marked as expired. For example, the default cache expiration policy may be 12 hours, 1 day, 7 days, or 30 days. In some embodiments, the cache can expire after the response is received by a client or a certain number of clients. In some embodiments, a user may configure the cache expiration interval. The user may be an operator of appliance 200, client 102, and/or database server 806. In some embodiments, one or more content groups of the cache, rather than the entire cache, may be set to expire or set to expire at a certain interval. For example, data stored in a content group 1, which may correspond to DB1, may be set to expire after one day, while data stored in content group 2, which may correspond to DB2, may be set to expire after 7 days.

In some embodiments, cache policies 805 may include policies for cache invalidation where one or more objects and/or all objects in a content group can be invalidated. In some embodiments, caches can also be invalidated by a user and through configured policies. For example, users can invalidate a complete datastream cache, a particular transaction or a complete content group. Caches can also be invalidated by a matching invalidation policy. For example a user may configure an invalidation policy to "invalidate all caches pertaining to a particular table whenever an INSERT query is executed successfully on the same table".

In some embodiments, a cache selector 807 may be configured to cache data into one or more content groups 809. Cache selectors 807 may refer to patterns or expressions that are formed of a combination of various parts of a request from the client and/or a response. Expressions may include Policy Infrastructure ("PI") expressions such as username, database name, character set, and/or client version. A selector may include a name and a logical expression. In some embodiments, a selector expression may include a URL stem and host.

In some embodiments, data and or objects obtained from the database server 706 can be grouped in cache memory into content groups 809. The content groups 809 can be associated with the cache selector 807, and may refer to entities that store the cached objects; e.g., cached objects may be a member of a content group. In some embodiments, the selector may also facilitate retrieving objects. For example, a content group 809 may use a hit selector to retrieve cached hits or use an invalidation selector to expired cached objects and fetch new ones from the origin server.

Content groups 809 may facilitate taking some action on a related set of data. For example, if a first content group is configured to contain all data pertaining to a particular database, e.g., DB1, then a subsequent insert operation on database DB1 can trigger the expiry of caches in the first content group. In some embodiments, if no group is specified while configuring cache policies, then data may be cached in a default group. The default group may expire upon an insert operation on any one of the databases on database server 706, only particular databases from which data is stored in the content group, expire upon a set time interval or a relative time, or may not be configured to automatically expire.

In some embodiments, configurations per content group 809 can include expiry settings, portions of object considered for caching as well as invalidation, pre-fetch objects before they expire, inserting headers, and/or memory related configurations for objects of the whole group.

In some embodiments, the cache hash 810 can perform hashing techniques to facilitate storing responses to the SQL query in cache memory. In some embodiments, the appliance 200 can use a cache selector 807 to determine a key for the hash. The cache selector 807 may be derived from a PI expression. For example, the hash technique can use two or more fields (e.g., username, database name, character set, and client version) to calculate a hash value indicating where to store the response in cache memory or, if there is a policy match, from where to retrieve a response stored in cache. For example, a hash key that may be used as an input to a hashing algorithm may include username and database name; username and character set; database name, character set and client version; or any other combination of two or more fields.

In some embodiments, the cache hash module 810 may calculate a hash value more efficiently by using the "hash" field present in an SQL user database entry, and then calculating the incremental hash over the key determined by the configured selector. In an illustrative example, a selector can be the complete query text. Invalidation selectors can also be used to invalidate cache elements selected by such selectors upon a particular invalidation policy match.

The cache hash module 810 can apply any type and form of hashing scheme to facilitate storing and or retrieving responses from the cache memory. In some embodiments, the hash functions correspond to those hash functions provided by an SQL server including, e.g., CHECK_SUM or BINARY_CHECKSUM. Various hashing algorithms may include MD2, MD4, MD5, SHA, SHA1, SHA2 256 and/or SHA2 512. In some embodiments, the cache hash module 810 can include hashing functionality as the RSS module 560.

In some embodiments, the appliance 200 may include an offline caching module 825 designed and constructed to facilitate offline caching. For example, in the event the database server 706 is not available or the intermediary device 200 cannot otherwise reach the database server 706, the intermediary device 200 can continue to serve data from the cache. If the requested data is not available in cache, the intermediary device can be configured to generate an error message in response to the request from the client, and send the error message to the client 102.

In some embodiments, the offline caching module 825 can be enabled by default to provide offline caching capabilities. In some embodiments, the offline caching module 825 can monitor the availability of the database server 706 or the status of the network 104 to determine whether to enter offline caching mode. In some embodiments, the offline caching module 825 can enter offline caching mode in response to increased latency in the response time from the database server 825.

In some embodiments, the offline caching module 825 may be configured to interact with one or more cache expiration policy. For example, if the offline caching module 825 or other module of appliance 200 determines that the database server 706 is unavailable, the offline caching module 825 may indicate to the cache policy module 805 that cache content groups 809 that are set to expire should not expire in the event that that intermediary device intercepts an SQL query request for such data and the database server 706 is unavailable to provide the response.

In some embodiments, the intermediary device 200 can include at least one counter 815. The counter 815 can monitor a plurality of events to facilitate generating a report, such as statistical reports on the number and types of events. The counter 815 can count events such as the number of hits (e.g., responses served from cache), misses (e.g., requests which matched a caching policy but the response was not present in the cache), number of bytes served by cache (e.g., total bytes served from cache), the number of cached objects, cache expiry (e.g., total cache expiries), invalidation requests (e.g., requests that match an invalidation policy and result in expiration of specific cached responses or entire content groups). Each counted event may correspond to a unit; e.g., the number of cached objects may have a value of counts, the number of bytes served from cache may be in bytes. In some embodiments, each event being counted may have its own dedicated counter. In other embodiments counters may count one or more events. In yet other embodiments, counters may be reusable for other events. Table 1 is an illustrative example of the types of events that the counter may count, a brief description of the event, the default poll status, and the values.

TABLE 1

Integrated Cache Counters

| Counter | Description | Default Poll | Values |
|---|---|---|---|
| 304 hit ratio (Percentage) | 304 responses as a percentage of all responses that the intermediary device served. | Y | Number |
| 304 hits | Total number of 304 Not Modified responses served from the cache. | Y | Count |
| Byte hit ratio (Percentage) | Bytes served from the cache divided by total bytes served to the client. If compression is On in the intermediary device, this ratio may not reflect the bytes served by the compression module. If the compression is Off this ratio is the same as cachePercentOriginBandwidthSaved. | Y | Number |
| Bytes served by Intermediary device | Total bytes served from cache. | Y | Bytes |
| Bytes served by cache | Bytes served from cache. | Y | Bytes |
| Cached objects | Responses currently stored in integrated cache. Includes responses fully downloaded, in the process of being downloaded, and expired or flushed but not yet removed. | Y | Count |
| Compressed bytes from cache | Bytes of compressed data served from the cache. | Y | Bytes |
| Conversions to conditional req | Number of user-agent requests for a cached Poll Every Time (PET) response that were sent to the origin server as conditional requests. | Y | Count |
| Expire at last byte | Instances of content expiring immediately after receiving the last body byte due to the Expire at Last Byte setting for the content group. | Y | Count |
| Flashcache hits | Instances of requests to a content group with flash cache enabled where the response was found and served. | Y | Count |

TABLE 1-continued

Integrated Cache Counters

| Counter | Description | Default Poll | Values |
|---|---|---|---|
| Flashcache misses | Number of requests to a content group with flash cache enabled that were cache misses. Flash cache distributes a response to all clients in a queue. | Y | Count |
| Hit ratio(Percentage) | Cache hits as percentage of the total number of requests. | Y | Number |
| Hits | Responses served from the integrated cache. These responses match a policy with a CACHE action. | Y | Count |
| Hits being served | This number should be close to the number of hits being served currently. | Y | Count |
| Inval requests | Requests that match an invalidation policy and result in expiration of specific cached responses or entire content groups. | Y | Count |
| Largest response so far (B) | Size, in bytes, of largest response sent to client from the cache or the origin server. | Y | Size in bytes |
| Maximum memory (KB) | Largest amount of memory the intermediary device can dedicate to caching, up to 50% of available memory. A 0 value disables caching, but the caching module continues to run. | Y | Size in kilobytes |
| Memory allocation failures | Total number of times the cache failed to allocate memory to store responses. | Y | Count |
| Misses | Total number of misses to the server. | Y | Count |
| Misses being handled | Cache misses processed. | Y | Count |
| Non-304 hits | Full (non-304) responses served from the cache. | Y | Count |
| Non-storable misses | Cache misses for which the fetched response is not stored in the cache. These responses match policies with a NOCACHE action or are affected by Poll Every Time. | Y | Count |
| Origin bandwidth saved (Percentage) | Bytes served from cache divided by total bytes served to client. | Y | Number |
| Poll every time hit ratio(Percentage) | Percentage of cache hits in content groups that have Poll Every Time enabled, relative to all searches of content groups with Poll Every Time enabled. | Y | Number |
| Poll every time hits | Number of times a cache hit was found during a search of a content group that has Poll Every Time enabled. | Y | Count |
| Poll every time requests | Requests that triggered a search of a content group that has Poll Every Time (PET) enabled (always consult the origin server before serving cached data). | Y | Count |
| Recent 304 hit ratio (Percentage) | Recently recorded ratio of 304 hits to all hits expressed as percentage. | Y | Number |
| Recent byte hit ratio (Percentage) | Cache byte hit ratio expressed as percentage. Byte hit ratio is defined as (number of bytes served from the cache)/(total number of bytes served to the client). If compression (CMP) is turned ON in the intermediary device, this ratio is not meaningful. This ratio might underestimate or overestimate the origin-to-cache bandwidth saving (depending upon whether bytes served by CMP in the intermediary device are more or less than compressed byte served from the cache). If CMP is turned OFF in intermediary device, this ratio is the same as cachePercentOriginBandwidthSaved. | Y | Number |
| Recent hit ratio (Percentage) | Cache byte hit ratio expressed as percentage. Byte hit ratio is defined as (number of bytes served from the cache)/(total number of bytes served to the client). If compression (CMP) is turned ON in intermediary device, this ratio is not meaningful. This ratio might underestimate or overestimate the origin-to-cache bandwidth saving (depending upon whether bytes served by CMP in intermediary device are more or less than compressed bytes served from the cache) If CMP is turned OFF in intermediary device, this ratio is the same as cachePercentOriginBandwidthSaved. | Y | Number |
| Recent storable miss ratio (Percentage) | Recent recorded ratio of misses where the response was considered cacheable expressed as a percentage. | Y | Number |
| Requests | Total requests. (=Total hits + Total misses). | Y | Count |
| Storable miss ratio (Percentage) | Responses that were fetched from the origin and stored in the cache, as a percentage of all cache misses. | Y | Number |
| Storable misses | Responses that were fetched from the origin, stored in the cache, and then served to the client, as a percentage of all cache misses. | Y | Count |
| Utilized memory (KB) | Amount of memory the integrated cache is currently using. | Y | Size in kilobytes |

In some embodiments, cache performance may be improved using one or more techniques such as refreshing a response prior to expiration, cache buffering, or by using solid state storage combined with performance optimization techniques. For example, cache buffering can include serving multiple request from cache before the complete response is downloaded. The amount of memory used by the appliance for integrated caching may be configurable.

In some embodiments, cache performance may be improved using Flash Cache ("FC"). FC may improve performance by queuing concurrent requests and serving a single response. In some embodiments, FC can improve performance by reducing the number of request sent to a back-end server, such as the database server 706. Flash Cache can be enabled for the entire cache, or for one or more content groups 809 of the cache.

Figure 8B:
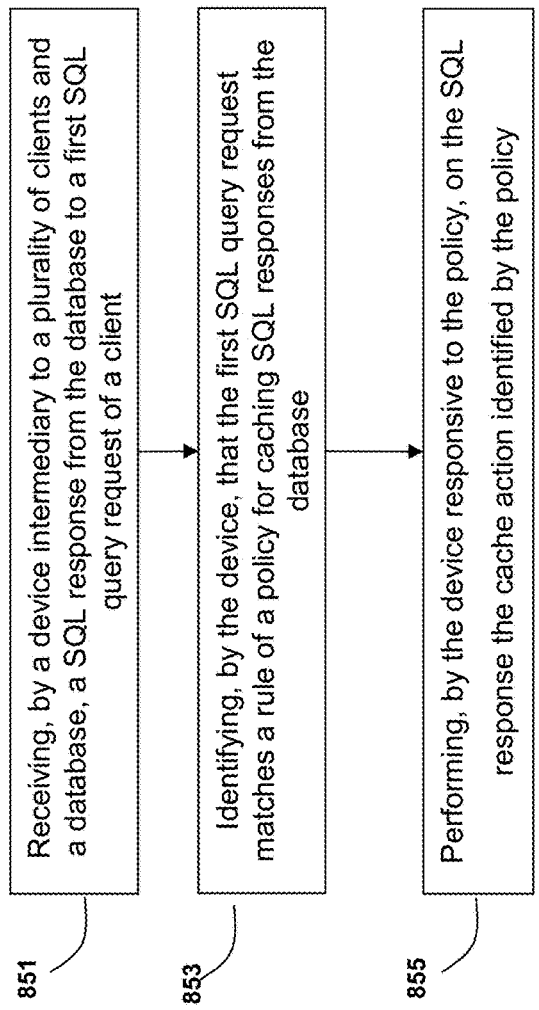
FIG. 8B is a block diagram of an embodiment of a method for SQL caching.

Referring to FIG. 8B, an embodiment of a method for caching, by a device intermediary to a client and a database, a result of a SQL query request is depicted. In brief overview, the method includes the step of receiving, by a device intermediary to a plurality of clients and a database, a SQL response from the database to a first SQL query request of a client of the plurality of clients (851). The device identifies that the first SQL query request matches a rule of a policy for caching SQL responses from the database (853). Responsive to the policy, the device performs the cache action identified by the policy on the SQL response (855).

In further details of 851, a device intermediary to a plurality of clients and a database server receives a SQL response from the database. The intermediary device may receive the response via a network. The response may be responsive to an SQL query request that was sent and/or generated by a client of the plurality of clients. In some embodiments, the intermediary device may have intercepted the SQL query request and then forwarded the request to the database server. In other embodiments, the client may have sent the query request to the database server and the database server may forward the response and/or query to the intermediary device for further processing.

In some embodiments, the intermediary device may include a cache of SQL responses from the databases. The intermediary device may have stored the responses in cache responsive to SQL query requests sent by one or more clients of the plurality of clients and a cache action indicated to store the response. In some embodiments, the intermediary device can maintain SQL responses in the cache via a hashing technique. For example, the device may identify a key that can be input to a hashing function to generate a value, which may indicate where in the cache to store the data object. Keys can be generated in various ways. In some embodiments, the device can generate a hash of two or more of the following: username, database name, character set, and client version. In some embodiments, the data used to generate the hash can be obtained from the SQL query request itself. In some embodiments, the data used to generate the has can be obtained from the response from the database, which is responsive to the SQL query request.

In further details of 853, and in some embodiments, the device identifies that the first SQL query request matches a rule of a policy for caching SQL responses from the database. In some embodiments, the intermediary device may identify that the SQL query request matches the rule of the policy prior to receiving the response from the database server, while in other embodiments the intermediary device may identify that the SQL query request matches the rule of the policy after receiving the response from the SQL server. For example, and in some embodiments, the intermediary device may identify whether the SQL query request matches the rule of the policy upon receiving the SQL query request from the client and prior to forwarding the SQL query request to the database server.

In some embodiments, the device may identify that an expression of the rule matches SQL content of the SQL query request. Expressions can include one or more expressions and can be grouped in parenthesis so that expressions within the parenthesis are evaluated before the resulting expression is combined with another. Expressions can include a constant, variable, scalar function, or column name. The expression may include or indicate a data type, collation, precision, scale and/or value. For example, an expression may include a combination of one or more values, operators and SQL functions that evaluate to a value. Expressions may be written in query language. For example, for an SQL SELECT statement, an expression may include a Boolean expression, numeric expression, and/or date expressions.

In some embodiments, the device may identify that the policy includes a cache action. The cache action may be one of to store the response in cache, not to cache the response, or to invalidate a corresponding cache entry. In some embodiments, the cache policy may not include a cache action. In some embodiments, the device may identify a default cache action or determine a cache action based on one or more criteria such as the available cache memory on the device, counter information, content group configuration, expiration information, etc.

If the intermediary device identifies that the SQL request matches a rule of a policy, the intermediary device may perform the cache action on the SQL response (855). In some embodiments, the intermediary device may identify that the cache action of the matching policy is to cache the response and, responsive to the cache action, store the SQL response. In some embodiments, a hashing technique may facilitate storing the SQL response in the cache. In some embodiments, the device may store the SQL response in a content group that groups a plurality of cached responses. In some embodiments, the cache action may specify to invalidate the SQL response stored in cache. In some embodiments, the device may invalidate the SQL response stored in cache responsive to the cache action of the matching policy.

In some embodiments, the cache action may be a default action. For example, the intermediary device may perform a default cache action upon identifying an SQL query request that matches a rule of a policy. In yet other embodiments, the cache action may be dependent upon other factors such as network latency, counter values, cache expiration values, database availability etc. In some embodiments, the cache action may depend on the type and/or size of the data object. For example, multimedia content (e.g., images, audio, video) may be cached, while text-based content may not be cached. In some embodiments, the cache action may depend on the amount of cache memory available on the intermediary device.

In some embodiments, the cache policy may specify a selector for identifying a content group. The selector may include patterns or expressions that are formed of a combination of various parts of a request from the client and/or a response. In some embodiments, the device may identify that a policy specified a selector for identifying a group of content to which the policy applies and/or perform the cache action of the policy on the group of content. For example, the policy may include a cache action to invalidate a content group.

In an illustrative example, the following pseudo code can facilitate adding a cache selector "add cache selector <selectorName><rule>", where selectorName and rule refer to placeholders for a name of selector and a rule:
 add cache selector sel1 mssql.req.query.text
 add cache selector inval_sel
  "MSSQL.REQ.QUERY.TEXT.AFTER_STR
   (\"from \").BEFORE_STR(\";\") ALT MSSQL.
   REQ.QUERY.TEXT.AFTER_STR(\"into \").BE-
   FORE_STR(\"/\")"

In an illustrative example, the following pseudo code can facilitate adding a cache content group "add cache contentgroup <name>(-hitSelector <hitSelectorName>-invalSelector <invalidationSelectorName>|-hitParams <hitParamName>-invalParams <invalidationParamName>)-type <type>[-relExpiry <sec>|-relExpiryMilliSec <msec>] [-heurExpiryParam <positiveInteger>]". In some embodiments, name refers to the name of the content group and can be a maximum of 31 characters; hitSelector (Hit selector) and invalSelector (Invalidation selector) are search filters for the content group; hitParams (Hit parameters) and invalParams (Invalidation parameters) are alternative to selectors that can be configured for hit and invalidation parameters in the content group definition; relExpiry and -relExpiryMilliSec (Expiry content after) are the relative expiry time in seconds, where the minimum value is 0 and the maximum value is 31536000, and the default value is not set; and heurExpiryParam (Heuristic) is the heuristic expiry time, as a percentage of the duration since the object was last modified, where the default value is not set and the minimum value is 0 and the maximum value is 100. For example:
 add cache contentGroup cg1-hitSelector sel1-invalselector inval_sel -relExpiry 500

In an illustrative example, the following pseudocode can facilitate adding a cache policy: add cache policy <name>-rule <expression>-action <action>[-storeInGroup <string>] [-invalGroups <string> . . . ] [-invalObjects <string> . . . ] [-undefAction (NOCACHE| RESET)]. The cache policy may include a rule (e.g., logical expression that evaluates an SQL query request or response), an action (e.g., determine what to do with the request or response that matches the policy rule), and/or a content group (e.g., one or more content groups for which the action is to be performed). For example:
 add cache policy cp1-rule "mssql.req.query.command. contains(\"select\")"-action CACHE -storeInGroup cg1
 add cache policy cp2-rule "mssql.req.query.text.contains (\"insert\")"-action INVAL -invalObjects cg1
 add cache policy res_pol-rule "mssql.res.done.rowcount <5"-action nocache The following are various other illustrative examples of pseudo code for functions of embodiments of the systems and methods of the present disclosure: to set the cache policy after it has been added: set cache policy <name>-action <string>; to remove a cache policy after it is has been added and/or set: rm cache policy <name>; to show a cache policy: show cache policy; to flush the cache of a content group: flush cache contentGroup <name>; and to show a cached object; show cache object.

In some embodiments, the device may receive a plurality of SQL requests from one or more of a plurality of clients. Upon receiving a response from the database to a first SQL query request from a client, the device may determine to store the response in cache. The device may subsequently receive a second SQL query request from the same or different client. In some embodiments, the device may determine that the second SQL query request includes the same SQL query of the first SQL query request. For example, the device may apply a cache policy to the SQL query to identify a match, where the cache policy indicated to store the response. Furthermore, a hash of an aspect of the SQL query may facilitate locating the stored response in cache. Responsive to identifying that the response to the SQL query is stored in cache, in some embodiments, the device may serve the SQL response from the cache.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method comprising:
 (a) identifying, by a device intermediary to a plurality of clients and a database, a policy specifying a selector for identifying a content group of a cache of a structured query language (SQL) responses received by the device from the database in response to SQL requests, the selector used to determine a key for identifying the content group in the cache; and
 (b) identifying, by the device responsive to the selector, the content group in the cache;

(c) performing, by the device responsive to the policy, a cache action of the policy on the content group of the cached identified by the selector.

2. The method of claim 1, wherein (a) further comprises using, by the device, the selector to determine the key for a hash function to calculate a value indicating where to store a SQL response in the cache.

3. The method of claim 1, wherein the content group corresponds to one or more particular objects in the database.

4. The method of claim 1, wherein the selector comprises an expression formed from a combination of portions of at least one of a SQL request from a client or an SQL response from the database.

5. The method of claim 1, wherein the expression may comprise one or more of the following: username, database name, character set or client version.

6. The method of claim 1, wherein the expression may comprise a uniform resource locator stem and a host.

7. The method of claim 1, wherein (b) further comprising applying, by the device, the selector to an SQL response to identify the content group.

8. The method of claim 1, wherein (b) further comprising applying, by the device, the selector to an SQL request to identify the content group.

9. The method of claim 1, wherein (c) further comprises performing, by the device, the cache action to an SQL response corresponding to the content group of one of the following: store to cache, not cache or invalidate a corresponding cache entry.

10. The method of claim 1, further comprising serving, by the device, an SQL response from the cache corresponding to the content group identified by the selector responsive to an SQL request requesting content corresponding to the content group.

11. A system comprising:
    a device intermediary to a plurality of clients and a database,
    a cache configured to cache structured query language (SQL) from the database,
    a policy engine configured with a policy specifying a selector for identifying a content group of a cache of SQL responses received by the device from the database in response to SQL requests, wherein the selector is used to determine a key for identifying the content group in the cache;
    wherein the device, responsive to the policy engine, is configured to perform a cache action of the policy on the content group of the cached identified by the selector.

12. The system of claim 11, wherein device is further configured to use the selector to determine the key for a hash function to calculate a value indicating where to store a SQL response in the cache.

13. The system of claim 11, wherein the content group corresponds to one or more particular objects in the database.

14. The system of claim 11, wherein the selector comprises an expression formed from a combination of portions of at least one of a SQL request from a client or an SQL response from the database.

15. The system of claim 11, wherein the expression may comprise one or more of the following: username, database name, character set or client version.

16. The system of claim 11, wherein the expression may comprise a uniform resource locator stem and a host.

17. The system of claim 11, wherein the policy engine is further configured to apply the selector to an SQL response to identify the content group.

18. The system of claim 11, wherein the policy engine is further configured to apply the selector to an SQL request to identify the content group.

19. The system of claim 11, wherein the device is further configured to perform the cache action to an SQL response corresponding to the content group of one of the following: store to cache, not cache or invalidate a corresponding cache entry.

20. The system of claim 11, wherein the device is further configured to server an SQL response from the cache corresponding to the content group identified by the selector responsive to an SQL request requesting content corresponding to the content group.

* * * * *